(12) United States Patent
Nakamura

(10) Patent No.: US 6,355,396 B1
(45) Date of Patent: Mar. 12, 2002

(54) PHOTOSENSITIVE COMPOSITION AND PLANOGRAPHIC PRINTING PLATE PRECURSOR USING SAME

(75) Inventor: Ippei Nakamura, Shizuoka-ken (JP)

(73) Assignee: Fuji Photo Film Co., Ltd., Minami-Ashigara (JP)

(*) Notice: Subject to any disclaimer, the term of this patent is extended or adjusted under 35 U.S.C. 154(b) by 0 days.

(21) Appl. No.: 09/533,946

(22) Filed: Mar. 23, 2000

(30) Foreign Application Priority Data

Mar. 25, 1999 (JP) .......................................... 11-082401

(51) Int. Cl.$^7$ .............................................. G03F 7/039
(52) U.S. Cl. ................ 430/281.1; 430/270.1; 430/944; 430/945
(58) Field of Search .............................. 430/944, 281.1, 430/270.1

(56) References Cited

U.S. PATENT DOCUMENTS

| | | | | |
|---|---|---|---|---|
| 5,135,842 A | * | 8/1992 | Kitchin et al. | 430/944 |
| 5,314,795 A | * | 5/1994 | Helland et al. | 430/944 |
| 5,409,797 A | * | 4/1995 | Hosoi et al. | 430/944 |
| 5,814,431 A | * | 9/1998 | Nagasaka et al. | 430/270.1 |
| 5,840,467 A | | 11/1998 | Kazuto et al. | 430/302 |

FOREIGN PATENT DOCUMENTS

| EP | 0 823 327 A | 11/1998 |
|---|---|---|
| WO | WO97/39894 | 10/1997 |

* cited by examiner

*Primary Examiner*—Cynthia Hamilton
(74) *Attorney, Agent, or Firm*—Burns, Doane, Swecker & Mathis, LLP

(57) ABSTRACT

Disclosed are a photosensitive composition characterized by high sensitivity and good latitude in development, and a positive-type planographic printing plate precursor that uses the composition in a direct plate production process and enables an image to be formed with high sensitivity with an infrared laser. Namely, the photosensitive composition is disclosed comprising components (a) and (b) as follows and becoming soluble in an aqueous alkaline solution when irradiated with an infrared laser:

(a) an infrared-ray absorbing agent represented by formula (I) as follows; and (b) a polymeric compound insoluble in water but soluble in an aqueous alkaline solution

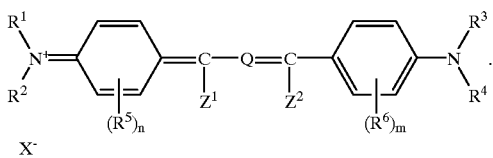

(I)

13 Claims, No Drawings

PHOTOSENSITIVE COMPOSITION AND PLANOGRAPHIC PRINTING PLATE PRECURSOR USING SAME

BACKGROUND OF THE INVENTION

1. Field of the Invention

The present invention relates to a photosensitive composition suitable as a positive-type image forming material and also to a planographic printing plate precursor using the composition. More specifically, the present invention relates to a positive-type image forming composition that is designed for use with an infrared laser and is characterized by writability with heat, particularly with an infrared laser, thermal head or the like, and by suitability for use in a planographic printing plate precursor that can be prepared by a so-called direct plate production process in which the plate is prepared directly according to digital signals, particularly from a computer or the like. Further, the present invention relates to a planographic printing plate precursor using the foregoing composition.

2. Description of the Related Art

In recent years, owing to progress in technologies related to solid-state lasers and semiconductor lasers emitting rays in regions ranging from a near-infrared region to an infrared region, a system that uses these infrared lasers in a printing plate production process so that a printing plate is prepared directly according to digital data from a computer, has been drawing attention.

Japanese Patent Application Laid-Open (JP-A) No. 7-285,275 discloses a material for a positive-type planographic printing plate precursor for use with an infrared laser in direct plate production. This invention relates to an image forming material comprising a resin soluble in an aqueous alkaline solution, a substance capable of generating heat by absorbing light, and a positive-type photosensitive compound such as a quinone diazide, wherein in image portions, the positive-type photosensitive compound acts as a dissolution inhibiting agent which substantially reduces the solubility of the resin soluble in the aqueous alkaline solution, whereas in non-image portions, the positive-type compound is thermally decomposed to thereby lose its dissolution inhibiting capability and can be removed through developing.

As a result of their investigations, the present inventors have found that a positive image can be obtained without using a quinone diazide in an image recording material. However, mere elimination of the quinone diazide from the image recording material presents a drawback in which the stability of sensitivity with respect to the concentration of a developer, i.e., latitude in development, becomes poor.

On the other hand, an onium salt or a compound capable of forming alkali-insoluble hydrogen bonds is known to act as an agent that inhibits an alkali-soluble polymer from becoming dissolved in an alkali. As to an image forming material for use with an infrared laser, WO 97/39,894 describes that a composition that uses a cationic, infrared-ray absorbing dye as an agent that inhibits an alkali-soluble polymer from being dissolved in an alkali exhibits a positive-type operation. This positive-type operation is an operation in which the infrared-ray absorbing dye absorbs the laser light and generates heat which causes the polymeric film to lose a dissolution-inhibiting effect in an irradiated region, to thereby form an image.

However, this invention is associated with a problem that, although the image-forming performance of the photosensitive composition at a surface thereof irradiated with a laser is satisfactory, a satisfactory effect cannot be obtained in depths of the composition because a sufficient amount of heat is not diffused to the depths, and, as a result, an on-off distinction between exposed areas and unexposed areas is insufficient in a developing process with alkali. Consequently, a good image is not obtained (i.e., low sensitivity and narrow latitude in development occurs). The term "latitude in development" as used herein means the broadness of the allowable range of the alkali concentrations of an alkaline developer for the creation of a good image.

SUMMARY OF THE INVENTION

Accordingly, an object of the present invention is to provide a photosensitive composition characterized by high sensitivity and good latitude in development, and to provide a positive-type planographic printing plate precursor that uses the foregoing composition in a direct plate production process and enables an image to be formed with high sensitivity with an infrared laser.

After a series of studies for the purpose of upgrading image-forming performance, i.e., increasing sensitivity and latitude in development, the present inventors found that latitude in development was improved by use of specific infrared-ray absorbing agents.

Namely, a photosensitive composition of the present invention comprises the following components (a) and (b) and becomes soluble in an aqueous alkaline solution when irradiated with an infrared laser:

(a) infrared-ray absorbing agent represented by the following general formula (I); and (b) a polymeric compound insoluble in water but soluble in an aqueous alkaline solution (hereinafter referred to at times as polymeric compound soluble in aqueous alkaline solution):

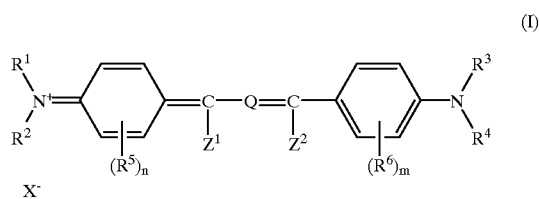

wherein $R^1$ through $R^4$ each independently represents a hydrogen atom, alkyl group or aryl group; $R^5$ and $R^6$ each independently represents an alkyl group, substituted oxy group or halogen atom; n and m each independently represents an integer from 0 through 4; $R^1$ and $R^2$, or $R^3$ and $R^4$ may combine with each other to form a ring, and $R^1$ and/or $R^2$ may combine with $R^5$, or $R^3$ and/or $R^4$ may combine with $R^6$, to form a ring; a plurality of $R^5$ or a plurality of $R^6$ may combine together to form a ring; $Z^1$ and $Z^2$ each independently represents a hydrogen atom, alkyl group or aryl group, at least one of $Z^1$ and $Z^2$ representing a hydrogen atom or an alkyl group; Q represents a trimethyne group or pentamethyne group, each of which may have a substituent group, and is able to form a cyclic structure together with a divalent organic group; and $X^-$ represents a counter anion.

An infrared-ray absorbing agent of the present invention for use in a photosensitive composition for image formation by irradiation with electromagnetic energy is substantially free from quinone diazide and is represented by the above-described formula (I).

Although the working mechanism of the photosensitive composition of the present invention is not clear, the mechanism is presumably as follows. The use of (a) the infrared-ray absorbing agent represented by the general formula (I) causes the photosensitive composition of the present invention to act as a dissolution inhibitor of (b) the polymeric compound soluble in an aqueous alkaline solution. The dissolution-inhibiting effect can be eliminated by heat, which is generated when the infrared-ray absorbing agent absorbs the laser light, in portions irradiated with the laser. Presumably because the infrared-ray absorbing agent of the present invention represented by the general formula (I) has a high dissolution-inhibiting property and allows absorbing and heating of the above-described laser light to be carried out efficiently, a high level of sensitivity and improved latitude in development can be achieved. Further, the infrared-ray absorbing agent of the present invention represented by the general formula (I) has an excellent solubility in a solvent.

Further, a planographic printing plate precursor of the present invention comprises a substrate and a photosensitive layer formed thereon, the photosensitive layer comprising the above-described photosensitive composition.

With the use of the above-described specific infrared-ray absorbing agent of the present invention, the photosensitive composition characterized by high sensitivity, stability of the sensitivity when developers having different densities are used, i.e. good latitude in development, and good storage stability can be provided. Further, the infrared-ray absorbing agent of the present invention has an excellent solubility in a solvent, and demonstrates a satisfactory image forming property even when the amount of the infrared-ray absorbing agent added to the photosensitive composition is reduced.

In addition, the planographic printing plate precursor using this photosensitive composition can be prepared directly by the use of the infrared lasers, and has an excellent effect in that it has a high level of sensitivity and satisfactory latitude in development.

DESCRIPTION OF THE PREFERRED EMBODIMENTS

Details of the present invention are given below. (a) Infrared-ray absorbing agent represented by the general formula (I)

The infrared-ray absorbing agent represented by the general formula (I) can cause solubility in an alkaline developer in an image forming portion to lower significantly by interaction with the above-described polymeric compound insoluble in water but soluble in aqueous alkaline solution. Further, in a non-image-forming portion, the infrared-ray absorbing agent represented by the general formula (I) itself is decomposed and/or the interaction resulting from the heating generated by absorption of the near infrared-rays causes the dissolution inhibiting capability to be lost. As a result, the non-image-forming portion recovers the solubility in aqueous alkaline solution and a satisfactory discrimination in forming an image is demonstrated.

The infrared-ray absorbing agent represented by the general formula (I) will now be described in further detail.

In the general formula (I), $R^1$ through $R^4$ each independently represents a hydrogen atom, alkyl group or aryl group.

$R^5$ and $R^6$ each independently represents an alkyl group, substituted oxy group or halogen atom.

n and m each independently represents an integer from 0 through 4.

$R^1$ and $R^2$, or $R^3$ and $R^4$ may combine with each other to form a ring. $R^1$ and/or $R^2$ may combine with $R^5$, or $R^3$ and/or $R^4$ may combine with $R^6$, to form a ring. Further, a plurality of $R^5$ or a plurality of $R^6$ may combine together to form a ring.

$Z^1$ and $Z^2$ each independently represents a hydrogen atom, alkyl group or aryl group, and at least one of $Z^1$ and $Z^2$ represents a hydrogen atom or alkyl group.

Q represents a trimethyne group or pentamethyne group, each of which may have a substituent group. Q may form a cyclic structure together with a divalent organic group. X represents a counter anion.

Specific examples of the above infrared-ray absorbing agent represented by the general formula (I) will be given below, but the present invention is not limited to these examples.

Examples of the alkyl group represented by $R^1$ through $R^4$, $R^5$ and $R^6$, and $Z^1$ and $Z^2$ include a linear alkyl group, a branched alkyl group, and a cyclic alkyl group, each having 1 to 20 carbon atoms. Specific examples of the alkyl group include methyl, ethyl, propyl, butyl, pentyl, hexyl, heptyl, octyl, nonyl, decyl, undecyl, dodecyl, tridecyl, hexadecyl, octadecyl, eicosyl, isopropyl, isobutyl, s-butyl, t-butyl, isopentyl, neopentyl, 1-methylbutyl, isohexyl, 2-ethylhexyl, 2-methylhexyl, cyclohexyl, cyclopentyl, and 2-norbornyl groups. Among these groups, preferable are a linear alkyl group having 1 to 12 carbon atoms, a branched alkyl group having 3 to 12 carbon atoms, and a cyclic alkyl group having 5 to 10 carbon atoms.

These alkyl groups may have a substituent group, and preferred examples of the substituent group are monovalent, nonmetallic atomic groups excluding a hydrogen atom. Preferred examples of the substituent group include halogen atoms (—F, —Br, —Cl, and —I), hydroxyl group, alkoxy groups, aryloxy groups, mercapto groups, alkylthio groups, arylthio groups, alkyldithio groups, aryldithio groups, amino groups, N-alkylamino groups, N,N-dialkylamino groups, N-arylamino groups, N,N-diarylamino groups, N-alkyl-N-arylamino groups, acyloxy groups, carbamoyloxy group, N-alkylcarbamoyloxy groups, N-arylcarbamoyloxy groups, N,N-dialkylcarbamoyloxy groups, N,N-diarylcarbamoyloxy groups, N-alkyl-N-arylcarbamoyloxy groups, alkylsulfoxy groups, arylsulfoxy groups, acylthio groups, acyl amino groups, N-alkylacylamino groups, N-arylacylamino groups, ureido groups, N'-alkylureido groups, N',N'-dialkylureido groups, N'-arylureido groups, N',N'-diarylureido groups, N'-alkyl-N'-arylureido groups, N-alkylureido groups, N-arylureido groups, N'-alkyl-N-alkylureido groups, N'-alkyl-N-arylureido groups, N', N'-dialkyl-N-alkylureido groups, N',N'-dialkyl-N-arylureido groups, N'-aryl-N-alkylureido groups, N'-aryl-N-alkylureido groups, N'-aryl-N-arylureido groups, N',N'-diaryl-N-alkylureido groups, N',N'-diaryl-N-arylureido groups, N'-alkyl-N'-aryl-N-alkylureido groups, N'-alkyl-N'-aryl-N-arylureido groups, alkoxycarbonylamino groups, aryloxycarbonylamino groups, N-alkyl-N-alkoxycarbonylamino groups, N-alkyl-N-aryloxycarbonylamino groups, N-aryl-N-alkoxycarbonylamino groups, N-aryl-N-aryloxycarbonylamino groups, formyl group, acyl groups, carboxyl group and conjugate base groups thereof (hereinafter referred to as "carboxylate"), alkoxycarbonyl groups, aryloxycarbonyl groups, carbamoyl group, N-alkylcarbamoyl groups, N,N-dialkylcarbamoyl groups, N-arylcarbamoyl groups, N,N-diarylcarbamoyl groups, N-alkyl-N-arylcarbamoyl groups, alkylsulfinyl groups, arylsulfinyl groups, alkylsulfonyl groups, arylsulfonyl groups, sulfo group (—$SO_3H$) and conjugate base groups thereof (hereinafter referred to as "sulfonato group"), alkoxysulfonyl groups, aryloxysulfonyl groups, sulfinamoyl group, N-alkylsulfinamoyl groups, N,N-dialkylsulfinamoyl groups, N-arylsulfinamoyl groups, N,N-diarylsulfinamoyl groups, N-alkyl-N-arylsulfinamoyl groups, sulfamoyl group, N-alkylsulfamoyl groups, N,N-dialkylsulfamoyl groups, N-arylsulfamoyl groups, N,N-diarylsulfamoyl groups, N-alkyl-N-arylsulfamoyl groups, N-acylsulfamoyl groups and conjugate base groups thereof, N-alkylsulfonylsulfamoyl groups (—SO$_2$NHSO$_2$R where R represents an alkyl group) and conjugate base groups thereof, N-arylsulfonylsulfamoyl groups (SO$_2$NHSO$_2$Ar where Ar represents an aryl group) and conjugate base groups thereof, N-alkylsulfonylcarbamoyl groups (—CONHSO$_2$R where R represents an alkyl group) and conjugate base groups thereof, N-arylsulfonylcarbamoyl groups (—CONHSO$_2$Ar where Ar represents an aryl group) and conjugate base groups thereof, alkoxysilyl groups (—Si(OR)$_3$ where R represents an alkyl group), aryloxysilyl groups (—Si(OAr)$_3$ where Ar represents an aryl group), hydroxysilyl group (—Si(OH)$_3$) and conjugate base groups thereof, phosphono group (—PO$_3$H$_2$) and conjugate base groups thereof (hereinafter referred to as "phosphonato group"), dialkylphosphono groups (—PO$_3$R$_2$ where R represents an alkyl group), diarylphosphono groups (—PO$_3$Ar$_2$ where Ar represents an aryl group), alkylarylphosphono groups (—PO$_3$(R)(Ar) where R represents an alkyl group and Ar represents an aryl group), monoalkylphosphono groups (—PO$_3$H(R) where R represents an alkyl group) and conjugate base groups thereof (hereinafter referred to as "alkylphosphonato group"), monoarylphosphono groups (—PO$_3$H(Ar) where Ar represents an aryl group) and conjugate base groups thereof (hereinafter referred to as "arylphosphonato group"), phosphonoxy group (—OPO$_3$H$_2$) and conjugate base groups thereof (hereinafter referred to as "phosphonatoxy group"), dialkylphosphonoxy groups (—OPO$_3$(R)$_2$ where R represents an alkyl group), diarylphosphonoxy groups (—OPO$_3$(Ar)$_2$ where Ar represents an aryl group), alkylarylphosphonoxy groups (—OPO$_3$(R)(Ar) where R represents an alkyl group and Ar represents an aryl group), monoalkylphosphonoxy groups (—OPO$_3$H(R) where R represents an alkyl group) and conjugate base groups thereof (hereinafter referred to as "alkylphosphonatoxy group"), monoarylphosphonoxy groups (—OPO$_3$H(Ar) where Ar represents an aryl group) and conjugate base groups thereof (hereinafter referred to as "arylphosphonatoxy group"), cyano group, nitro group, aryl groups, alkenyl groups, and alkynyl groups.

Specific examples of the alkyl groups in these substituent groups that substitute the alkyl groups also include the previously described alkyl groups. Further, specific examples of the aryl groups in these substituent groups include phenyl, biphenyl, naphthyl, tolyl, xylyl, mesityl, cumenyl, fluorophenyl, chlorophenyl, bromophenyl, chloromethylphenyl, hydroxyphenyl, methoxyphenyl, ethoxyphenyl, phenoxyphenyl, acetoxyphenyl, benzoyloxyphenyl, methylthiophenyl, phenylthiophenyl, methylaminophenyl, dimethylaminophenyl, acetylaminophenyl, carboxyphenyl, methoxycarbonylphenyl, ethoxycarbonylphenyl, phenoxycarbonylphenyl, N-phenylcarbamoylphenyl, nitrophenyl, cyanophenyl, sulfophenyl, sulfonatophenyl, phosphonophenyl, and phosphonatophenyl groups.

Further, specific examples of the aryl groups in these substituent groups that substitute the alkyl groups also include the previously described aryl groups. Examples of the alkenyl group include vinyl, 1-propenyl, 1-butenyl, cinnamyl, and 2-chloro-1-ethenyl groups. Examples of the alkynyl group include ethynyl, 1-propynyl, 1-butynyl, trimethylsilylethynyl, and phenylethynyl groups. Examples of the acyl groups (R$^1$CO—) include the groups in which R$^1$ represents one of the following: a hydrogen atom, and the previously described alkyl, aryl, alkenyl, and alkynyl groups.

Among these substituent groups, preferable are halogen atoms (—F, —Br, —Cl, and —I), alkoxy groups, aryloxy groups, alkylthio groups, arylthio groups, N-alkylamino groups, N,N-dialkylamino groups, acyloxy groups, N-alkylcarbamoyloxy groups, N-arylcarbamoyloxy groups, acylamino groups, formyl group, acyl groups, carboxyl group, alkoxycarbonyl groups, aryloxycarbonyl groups, carbamoyl group, N-alkylcarbamoyl groups, N,N-dialkylcarbamoyl groups, N-arylcarbamoyl groups, N-alkyl-N-arylcarbamoyl groups, sulfo group, sulfonato group, sulfamoyl group, N-alkylsulfamoyl groups, N,N-dialkylsulfamoyl groups, N-arylsulfamoyl groups, N-alkyl-N-arylsulfamoyl groups, phosphono group, phosphonato group, dialkylphosphono groups, diarylphosphono groups, monoalkylphosphono groups, alkylphosphonato groups, monoarylphosphono groups, arylphosphonato groups, phosphonoxy group, phosphonatoxy group, aryl groups, and alkenyl groups.

In the substituted alkyl groups, examples of the alkylene group that combines with a substituent group to form a substituted alkyl group include divalent organic residual groups which are formed when any one of the hydrogen atoms is removed from the previously described alkyl groups having 1 to 20 carbon atoms. Among these groups, preferable are a linear alkylene group having 1 to 12 carbon atoms, a branched alkylene group having 3 to 12 carbon atoms, and a cyclic alkylene group having 5 to 10 carbon atoms. Preferred specific examples of the substituted alkyl groups, which are formed by combining the substituent groups and the alkylene groups, include chloromethyl, bromomethyl, 2-chloroethyl, trifluoromethyl, methoxymethyl, methoxyethoxyethyl, allyloxymethyl, phenoxymethyl, methylthiomethyl, tolythiomethyl, ethylaminoethyl, diethylaminopropyl, morpholinopropyl, acetyloxymethyl, benzoyloxymethyl, N-cyclohexylcarbamoyloxyethyl, N-phenylcarbamoyloxyethyl, acetylaminoethyl, N-methylbenzoylaminopropyl, 2-oxoethyl, 2-oxopropyl, carboxypropyl, methoxycarbonylethyl, methoxycarbonylmethyl, methoxycarbonylbutyl, allyloxycarbonylbutyl, chlorophenoxycarbonylmethyl, carbamoylmethyl, N-methylcarbamoylethyl, N,N-dipropylcarbamoylmethyl, N-(methoxyphenyl)carbamoylethyl, N-methyl-N-(sulfophenyl)carbamoylmethyl, sulfopropyl, sulfobutyl, sulfonatobutyl, sulfamoylbutyl, N-ethylsulfamoylmethyl, N,N-dipropylsulfamoylpropyl, N-tolylsulfamoylpropyl, N-methyl-N-(phosphonophenyl)sulfamoyloctyl, phosphonobutyl, phosphonatohexyl, diethylphosphonobutyl, diphenylphosphonopropyl, methylphosphonobutyl, methylphosphonatobutyl, tolylphosphonohexyl, tolylphosphonatohexyl, phosphonoxypropyl, phosphonatoxybutyl, benzyl, phenethyl, α-methylbenzyl, 1-methyl-1-phenylethyl, p-methylbenzyl, cinnamyl, allyl, 1-propenylmethyl, 2-butenyl, 2-methylallyl, 2-methylpropenylmethyl, 2-propynyl, 2-butynyl, and 3-butynyl groups.

Examples of the aryl group represented by R$^1$ through R$^4$, R$^5$ and R$^6$, and Z$^1$ and Z$^2$ include a fused ring formed by 1 to 3 benzene rings and a fused ring formed by a benzene ring and a 5-membered unsaturated ring. Specific examples include phenyl, naphthyl, antholyl, phenantholyl, indenyl, acenabutenyl, and fluorenyl groups. Among these groups, phenyl and naphthyl groups are preferable.

Examples of the substituted aryl groups include the previously described aryl groups wherein a ring-forming carbon atom has as a substituent group thereof a monovalent nonmetallic atomic group excluding a hydrogen atom. Preferred specific examples of the substituent group include the previously described alkyl groups and substituted alkyl groups, and the groups described as the substituent groups in the substituted alkyl groups.

Preferred specific examples of these substituted aryl groups include biphenyl, tolyl, xylyl, mesityl, cumenyl, chlorophenyl, bromophenyl, fluorophenyl, chloromethylphenyl, trifluoromethylphenyl, hydroxyphenyl, methoxyphenyl, methoxyethoxyphenyl, allyloxyphenyl, phenoxyphenyl, methylthiophenyl, tolylthiophenyl, phenylthiophenyl, ethylaminophenyl, dimethylaminophenyl, diethylaminophenyl, morpholinophenyl, acetyloxyphenyl, benzoyloxyphenyl, N-cyclohexylcarbamoyloxyphenyl, N-henylcarbamoyloxyphenyl, acetylaminophenyl, N-methylbenzoylaminophenyl, carboxyphenyl, methoxycarbonylphenyl, allyloxycarbonylphenyl, chlorophenoxycarbonylphenyl, carbamoylphenyl, N-methylcarbamoylphenyl, N,N-dipropylcarbamoylphenyl, N-(methoxyphenyl)carbamoylphenyl, N-methyl-N-(sulfophenyl)carbamoylphenyl, sulfophenyl, sulfonatophenyl, sulfamoylphenyl, N-ethylsulfamoylphenyl, N,N-dipropylsulfamoylphenyl, N-tolylsulfamoylphenyl, N-methyl-N-(phosphonophenyl)sulfamoylphenyl, phosphonophenyl, phosphonatophenyl, diethylphosphonophenyl, diphenylphosphonophenyl, methylphosphonophenyl, methylphosphonatophenyl, tolylphosphonophenyl, tolylphosphonatophenyl, allylphenyl, 1-propenylmethylphenyl, 2-butenylphenyl, 2-methylallylphenyl, 2-methylpropenylphenyl, 2-propynylphenyl, 2-butynylphenyl, and 3-butynylphenyl groups.

Substituted oxy groups represented by $R^5$ and $R^6$ may be those in which the group combining with the oxygen atom represents a monovalent nonmetallic atomic group excluding a hydrogen atom. Preferred examples of the substituted oxy group include alkoxy groups, aryloxy groups, acyloxy groups, carbamoyloxy group, N-alkylcarbamoyloxy groups, N-arylcarbamoyloxy groups, N,N-dialkylcarbamoyloxy groups, N,N-diarylcarbamoyloxy groups, N-alkyl-N-arylcarbamoyloxy groups, alkylsulfoxy groups, arylsulfoxy groups, phosphonoxy group, and phosphonatoxy group. Examples of the alkyl and aryl groups in the foregoing groups include the previously described groups exemplified as alkyl groups, substituted alkyl groups, aryl groups, and substituted aryl groups. Further, examples of the acyl groups ($R^{13}CO—$) in the acyloxy groups include the acyl groups whose $R^{13}$ is previously exemplified as alkyl groups, substituted alkyl groups, aryl groups, and substituted aryl groups. Among these substituent groups, preferable are alkoxy groups, aryloxy groups, acyloxy groups, and arylsulfoxy groups. Preferred specific examples of the substituted oxy group include methoxy, ethoxy, propyloxy, isopropyloxy, butyloxy, pentyloxy, hexyloxy, dodecyloxy, benzyloxy, allyloxy, phenethyloxy, carboxyethyloxy, methoxycarbonylethyloxy, ethoxycarbonylethyloxy, methoxyethoxy, phenoxyethoxy, methoxyethoxyethoxy, ethoxyethoxyethoxy, morpholinoethoxy, morpholinopropyloxy, allyloxyethoxyethoxy, phenoxy, tolyloxy, xylyloxy, mesityloxy, cumenyloxy, methoxyphenyloxy, ethoxyphenyloxy, chlorophenyloxy, bromophenyloxy, acetyloxy, benzoyloxy, naphthyloxy, phenylsulfonyloxy, phosphonoxy, and phosphonatoxy groups.

Examples of the halogen atom in $R^5$ and $R^6$ include fluorine, chlorine, bromine, iodine and the like. $R^1$ and $R^2$, or $R^3$ and $R^4$ may combine with each other to form a ring. $R^1$ or $R^2$ may combine with $R^5$, or $R^3$ or $R^4$ may combine with $R^6$, to form a ring. Further, in a case where the m and n are 2 or larger, a plurality of $R^5$ or a plurality of $R^6$ may combine together to form a ring. In addition, in a case where m or n is 2, $R^1$ and $R^2$ may combine with $R^5$, or $R^3$ and $R^4$ may combine with $R^6$, to form a ring. n and m each independently represents an integer of from 0 through 4.

It is necessary that at least one of $Z^1$ and $Z^2$ represents a hydrogen atom or alkyl group. In the present invention, the use of the above-described infrared-ray absorbing agent enables an excellent solubility in a solvent, and a satisfactory image forming property occurs even when the amount of the infrared-ray absorbing agent added to the photosensitive composition is made smaller.

Examples of the substituent group of Q include monovalent nonmetallic atomic groups excluding a hydrogen atom. Preferred examples thereof include, first of all, an alkyl group or aryl group, each of which may have a substituent group. Specific examples of the alkyl group and aryl group preferably include the examples of the alkyl group and aryl group represented by $R^1$ through $R^4$, $R^5$ and $R^6$, and $Z^1$ and $Z^2$ described above. Further, in addition to the above examples, preferred examples of the substituent group of Q include an alkenyl group possibly having a substituent group and an alkynyl group possibly having a substituent group. Examples of the alkenyl group include a vinyl, phenylvinyl, diakylaminophenylvinyl, phenylvinyl, 1-propenyl, 1-butenyl, cinnamyl, 2-chloro-1-ethenyl group and the like. Further, examples of the alkynyl group include an ethynyl, 1-propynyl, 1-butynyl, trimethylsilylethynyl, phenylethynyl group and the like. Further, preferred examples of the substituent group of Q include halogen atoms (—F, —Br, —Cl, and), hydroxyl group, alkoxy groups, aryloxy groups, mercapto groups, alkylthio groups, arylthio groups, alkyldithio groups, aryldithio groups, amino groups, N-alkylamino groups, N,N-dialkylamino groups, N-arylamino groups, N,N-diarylamino groups, N-alkyl-N-arylamino groups, acyloxy groups, carbamoyloxy groups, N-alkylcarbamoyloxy groups, N-arylcarbamoyloxy groups, N,N-dialkylcarbamoyloxy groups, N,N-diarylcarbamoyloxy groups, N-alkyl-N-arylcarbamoyloxy groups, alkylsulfoxy groups, arylsulfoxy groups, acylthio groups, acylamino groups, N-alkylacylamino groups, N-arylacylamino groups, ureido groups, N alkylureido groups, N N dialkylureido groups, N arylureido groups, N N diarylureido groups, N alkyl-N arylureido groups, N-alkylureido groups, N-arylureido groups, N alkyl-N-alkylureido groups, N alkyl-N-arylureido groups, N N dialkyl-N-alkylureido groups, N N dialkyl-N-arylureido groups, N aryl-N-alkylureido groups, N aryl-N-alkylureido groups, N aryl-N-arylureido groups, N N diaryl-N-alkylureido groups, N N diaryl-N-arylureido groups, N alkyl-N aryl-N-alkylureido groups, N alkyl-N aryl-N-arylureido groups, alkoxycarbonylamino groups, aryloxycarbonylamino groups, N-alkyl-N-alkoxycarbonylamino groups, N-alkyl-N-aryloxycarbonylamino groups, N-aryl-N-alkoxycarbonylamino groups, N-aryl-N-aryloxycarbonylamino groups, formyl group, acyl groups, carboxyl group and conjugate base groups thereof (hereinafter referred to as arboxylate, alkoxycarbonyl groups, aryloxycarbonyl groups, carbamoyl group, N-alkylcarbamoyl groups, N,N-dialkylcarbamoyl groups, N-arylcarbamoyl groups, N,N-diarylcarbamoyl groups, N-alkyl-N-arylcarbamoyl groups, alkylsulfinyl groups, arylsulfinyl groups, alkylsulfonyl groups, arylsulfonyl groups, sulfo group (—$SO_3H$) and conjugate base groups thereof (hereinafter referred to as ulfonato group, alkoxysulfonyl groups, aryloxysulfonyl groups, sulfinamoyl group, N-alkylsulfinamoyl groups, N,N-dialkylsulfinamoyl groups, N-arylsulfinamoyl groups, N,N-diarylsulfinamoyl groups, N-alkyl-N-arylsulfinamoyl groups, sulfamoyl group, N-alkylsulfamoyl groups, N,N-dialkylsulfamoyl groups, N-arylsulfamoyl groups, N,N-diarylsulfamoyl groups, N-alkyl-N-arylsulfamoyl groups, N-acylsulfamoyl groups and conjugate base groups thereof, N-alkylsulfonylsulfamoyl groups (—$SO_2NHSO_2R$ where R represents an alkyl group) and conjugate base groups thereof, N-arylsulfonylsulfamoyl groups (—$SO_2NHSO_2Ar$ where Ar represents an aryl group) and conjugate base groups thereof, N-alkylsulfonylcarbamoyl groups (—$CONHSO_2R$ where R represents an alkyl group) and conjugate base groups thereof, N-arylsulfonylcarbamoyl groups (—$CONHSO_2Ar$ where Ar represents an aryl group) and conjugate base groups thereof, alkoxysilyl groups (—Si(OR)$_3$ where R represents an alkyl group), aryloxysilyl groups (—Si(OAr)$_3$ where Ar represents an aryl group), hydroxysilyl group (—Si(OH)$_3$) and conjugate base groups thereof, phosphono group (—$PO_3H_2$) and conjugate base groups thereof (hereinafter referred to as hosphonato group, dialkylphosphono groups (—$PO_3R_2$ where R represents an alkyl group), diarylphosphono groups (—$PO_3Ar_2$ where Ar represents an aryl group), alkylarylphosphono groups (—$PO_3(R)(Ar)$ where R represents an alkyl group and Ar represents an aryl group), monoalkylphosphono groups (—$PO_3H(R)$ where R represents an alkyl group) and conjugate base groups thereof (hereinafter referred to as "alkylphosphonato group"), monoarylphosphono groups (—$PO_3H(Ar)$ where Ar represents an aryl group) and conjugate base groups thereof (hereinafter referred to as "arylphosphonato group"), phosphonoxy group (—$OPO_3H_2$) and conjugate base groups thereof (hereinafter referred to as "phosphonatoxy group, dialkylphosphonoxy groups (—$OPO_3R_2$ where R represents an alkyl group), diarylphosphonoxy groups (—$OPO_3Ar_2$ where Ar represents an aryl group), alkylarylphosphonoxy groups (—$OPO_3(R)(Ar)$ where R represents an alkyl group and Ar represents an aryl group), monoalkylphosphonoxy groups (—$OPO_3H(R)$ where R represents an alkyl group) and conjugate base groups thereof (hereinafter referred to as lkylphosphonatoxy group, monoarylphosphonoxy groups (—$OPO_3H(Ar)$ where Ar represents an aryl group) and conjugate base groups thereof (hereinafter referred to as rylphosphonatoxy group, cyano group, nitro group and the like.

Specific examples of the alkyl groups in these substituent groups include the previously described alkyl groups. Further, specific examples of the aryl groups in these substituent groups include phenyl, biphenyl, naphthyl, tolyl, xylyl, mesityl, cumenyl, fluorophenyl, chlorophenyl, bromophenyl, chloromethylphenyl, hydroxyphenyl, methoxyphenyl, ethoxyphenyl, phenoxyphenyl, acetoxyphenyl, benzoyloxyphenyl, methylthiophenyl, phenylthiophenyl, methylaminophenyl, dimethylaminophenyl, acetylaminophenyl, carboxyphenyl, methoxycarbonylphenyl, ethoxycarbonylphenyl, phenoxycarbonylphenyl, N-phenylcarbamoylphenyl, nitrophenyl, cyanophenyl, sulfophenyl, sulfonatophenyl, phosphonophenyl, and phosphonatophenyl groups.

Further, examples of the acyl groups ($R^1CO$—) include the groups in which $R^1$ represents one of the following: a hydrogen atom, and the previously described alkyl, aryl, alkenyl, and alkynyl groups.

Among these substituent groups, more preferable are alkyl groups, aryl groups, alkenyl groups, halogen atoms (—F, —Br, —Cl, and —I), alkoxy groups, hydroxyl group, aryloxy groups, alkylthio groups, arylthio groups, N-alkylamino groups, N,N-dialkylamino groups, acyloxy groups, N-alkylcarbamoyloxy groups, N-arylcarbamoyloxy groups, acylamino groups, formyl group, acyl groups, carboxyl group, alkoxycarbonyl groups, aryloxycarbonyl groups, carbamoyl group, N-alkylcarbamoyl groups, N,N-dialkylcarbamoyl groups, N-arylcarbamoyl groups, N-alkyl-N-arylcarbamoyl groups, sulfo group, sulfonato group, sulfamoyl group, N-alkylsulfamoyl groups, N,N-dialkylsulfamoyl groups, N-arylsulfamoyl groups, N-alkyl-N-arylsulfamoyl groups, phosphono group, phosphonato group, dialkylphosphono groups, diarylphosphono groups, monoalkylphosphono groups, alkylphosphonato groups, monoarylphosphono groups, arylphosphonato groups, phosphonoxy group, and phosphonatoxy group.

Further, Q may form a ring together with a divalent organic group such as the alkylene group or alkenylene group. Examples of the formed ring include a ring having 4 to 7 atoms (excluding the hydrogen atom), and the hydrogen formed on the ring may be substituted by the substituent group previously described as the preferable substituent groups of Q.

In the general formula (I), $X^-$ represents a counter anion, and examples thereof include $MQ_n^-$ (wherein M is an atom selected from B, P, As, Sb, Fe, Al, Sn, Zn, Ti, Cd, Mo, W and Zr; preferably, M is B, P, As, or Sb; Q represents a halogen atom, and n is an integer of from 1 to 6), $MQ_{n-1}(OH)^-$ (wherein M, Q and n are the same as above), $Br^-$, $Cl^-$, $I^-$, $NO_3^-$ and the like. Preferred examples of an anion expressed by $MQ_n^-$ include $BF_4^-$, $PF_6^-$, $AsF_6^-$, $SbF_6^-$ and the like. Of these, the most preferable is $SbF_6^-$. Further, preferred examples of an anion expressed by $MQ_{n-1}(OH)^-$ include $SbF_6^-$ and the like.

Further, examples of the other anions include:
1) a perchlorate ion;
2) a trifluoro methyl sulfite ion;
3) a methanesulfonate ion;:
4) an ethanesulfonate ion;
5) a 1-propanesulfonate ion;
6) a 2-propane sulfonate ion;
7) an n-propanesulfonate ion;
8) an allylsulfonate ion;
9) a 10-camphorsulfonate ion;
10) a trifluoromethanesulfonate ion;
11) a pentafluoroethanesulfonate ion;
12) a benzenesulfonate ion;
13) a p-toluenesulfonate ion;
14) a 3-methoxybenzenesulfonate ion;
15) a 4-methoxybenzenesulfonate ion;
16) a 4-hydroxybenzenesulfonate ion;
17) a 4-chlorobenzenesulfonate ion;
18) a 3-nitrobenzenesulfonate ion;
19) a 4-nitrobenzenesulfonate ion;
20) a 4-acetylbenzenesulfonate ion;
21) a pentafluorobenzenesulfonate ion;
22) a 4-dodecylbenzenesulfonate ion;
23) a mesitylenesulfonate ion;
24) a 2,4,6-triisopropylbenzenesulfonate ion;
25) a 2-hydroxy-4-methoxybenzophenone-5-sulfonate ion;
26) an isophthalic acid dimethyl-5-sulfonate ion;

27) a diphenylamine-4-sulfonate ion;
28) a 1-naphthalenesulfonate ion;
29) a 2-naphthalenesulfonate ion;
30) a 2-naphthol-6-sulfonate ion;
31) a 2-naphthol-7-sulfonate ion;
32) an anthraquinone-1-sulfonate ion;
33) an anthraquinone-2-sulfonate ion;
34) a 9,10-dimethoxyanthracene-2-sulfonate ion;
35) a 9,10-diethoxyanthracene-2-sulfonate ion;
36) a quinoline-8-sulfonate ion;
37) an 8-hydroxyquinoline-5-sulfonate ion;
38) an 8-anilino-naphthalene-1-sulfonate ion; and the like.

Next, a description will be given of the methods of manufacturing the infrared absorbing agent represented by the above general formula (I).

The infrared absorbing agent represented by the above general formula (I) can be synthesized by representative known methods described in *Justus Liebigs Ann. Chem.*, vol. 623 (1959), pp.204 to 261; *Ukr. Khi. Zh.*, vol. 22 (1956), pp. 347 to 348; *Chem. Heterocycl. Compd.*, vol. 18 (1982), pp. 334 to 336, *J. Heterocycl. Chem.*, vol. 25 (1988), pp. 1,321 to 1,325; Japanese Patent Application Laid-Open (JP-A) No. 60-231766; and the like. Synthesis examples will be given below.

Synthesis example 1 (synthesis of IR-5)

(1) 50.8 g of 4-N,N-diethylaminobenzaldehyde and 12.1 g of cyclopentanone were dissolved in 200 ml of ethanol. To this was added 31 g of a 10% aqueous solution of sodium hydroxide. The solution was then stirred for 8 hours at a temperature of from 40 to 50° C. for reaction. The precipitated crystal was filtered out, and washed with 80 ml of ethanol and 200 ml of water and dried. In this way, 52.5 g of 2,5-bis(4-N,N-diethylaminobenzylydene)cyclopentanone in the form of an orange crystal was obtained.

(2) 12.1 g of the 2,5-bis(4-N,N-diethylaminobenzylydene)cyclopentanone was dissolved in a mixed solvent of 100 g of tetrahydrofurfurylalcohol and 150 g of tetrahydrofuran. To this was added 1.1 g of sodium borohydride. After the solution was heated for 8 hours at a temperature of from 30 to 45° C., a mixed solution of 5.5 g of 48% tetrafluoroboric acid and 30 g of acetic acid was poured in the solution at room temperature. The precipitated dark green crystal was filtered out, washed with water and dried, to obtain 5.5 g of infrared absorbing agent IR-5.

Synthesis example 2 (synthesis of IR-18)

(1) 51.8 g of 2-(N-ethylanilino)ethanol and 31.7 g of triethylamine were dissolved in 300 ml of acetone. To this was added slowly 25 g of acetyl chloride while cooling the resulting reaction solution with ice water. The resulting solution was then stirred for 6 hours at room temperature for reaction. 200 ml of water was then poured into the solution. The organic layer was extracted with ethyl acetate and dried with sodium sulfate. The solvent was then distilled off under reduced pressure to obtain 64.9 g of 2-(N-ethylanilino)ethyl acetate.

(2) 55.8 g of phosphoryl chloride cooled with ice was added to 26.6 g of N,N-dimethyl formamide. To this, a solution of 63.0 g of the 2-(N-ethylanilino)ethyl acetate and 40 ml of N,N-dimethyl formamide was added slowly at room temperature. The resulting solution was stirred for 6 hours at room temperature for reaction, and then was poured in an aqueous solution of 150 g of sodium acetate that was being cooled with ice water. The organic layer was extracted with ethyl acetate. The solvent was then distilled off under reduced pressure and purified by chromatography on silica, to obtain 60.2 g of 2-(ethyl(4-formylphenyl)amino)ethyl acetate.

(3) A mixture of 51.0 g of 4-N,N-diethylaminobenzaldehyde, 72.7 g of cyclopentanone, 19.0 g of 85% potassium hydroxide pellet and 450 ml of water was heated at reflux for 25 hours. The excess cyclopentanone was then distilled off by a normal method. The precipitated crystal was filtered out, and crystallized with ethanol and dried. In this way, 45.5 g of 2-(4-(diethylamino)benzylydene)cyclopentanone in the form of an orange crystal was obtained.

(4) 40.5 g of the 2-(ethyl(4-formylphenyl)amino)ethyl acetate and 41.8 g of 2-(4-(diethylamino)benzylydene)cyclopentanone were dissolved in 120 ml of ethanol. To this was added 19 g of a 10% aqueous solution of sodium hydroxide. The solution was then stirred for 6 hours at a temperature of from 40° C. to 50° C. for reaction. The precipitated crystal was filtered out, and washed with 50 ml of ethanol and 150 ml of water and dried. In this way, 38.5 g of 2-(4-(diethylamino)benzylydene)-5-(4-(ethyl(2-hydroxyethyl)amino)benzylydene)cyclopentanone in the form of an orange crystal was obtained.

(5) 10.5 g of the 2-(4-(diethylamino)benzylydene)-5-(4-(ethyl(2-hydroxyethyl)amino)benzylydene)cyclopentanone was dissolved in a mixed solvent of 100 g of tetrahydrofurfurylalcohol and 150 g of tetrahydrofuran. To this was added 1.1 g of sodium borohydride. After the solution was reacted for 8 hours at a temperature of from 30° C. to 45° C., a mixed solution of 4.2 g of 60% perchloric acid and 3 g of acetic acid was poured in the solution at room temperature. The precipitated dark green crystal was filtered out, washed with water and dried, to obtain 4.3 g of infrared absorbing agent IR-18.

Synthesis example 3 (synthesis of IR-30)

(1) 49.6 g of 4-(dimethylamino)benzophenone was dissolved in 120 ml of tetrahydrofuran. The resulting solution was then added to 250 ml of 1N methyl bromide magnesium solution in tetrahydrofuran while being cooled with ice. The resulting reaction solution was heated at reflux for 1 hour. To this, an aqueous solution of ammonium chloride was added, and the solution was processed by a normal method to obtain an alcohol intermediate. Subsequently, the resultant alcohol intermediate was dissolved in 200 ml of acetic anhydride and refluxed for 2 hours. The solvent was then distilled off under reduced pressure to obtain 39 g of dimethyl(4-(1-dimethylphenylvinyl)phenyl)amine.

(2) 28 g of dimethyl(4-(1-dimethylphenylvinyl)phenyl)amine and 22 g of 4-dimethylamino cinnamic aldehyde were dissolved in 200 ml of acetic anhydride and refluxed for 3 hours. The resulting reaction solution was cooled to room temperature. To this, a mixture of 11 ml of 70% perchloric acid and 600 ml of acetic acid was slowly added, and the resulting solution was refluxed again for 10 minutes. The reaction solution was cooled, 600 ml of water was added to the solution, and a precipitate was filtered out. After being washed with water, the precipitate was recrystalized with a mixed solvent of ethanol and water to obtain 12 g of infrared absorbing agent IR-30.

Synthesis example 4 (synthesis of IR-46)

(1) 42.8 g of 4-N,N-diethylaminobenzaldehyde and 14.1 g of cyclohexanone were dissolved in 200 ml of ethanol. To this was added 31 g of a 10% aqueous solution of sodium hydroxide. The resulting solution was then stirred for 7 hours at a temperature of from 40° C. to 50° C. for reaction. The precipitated crystal was filtered out, and washed with 80 ml of ethanol and 200 ml of water and dried. In this way, 47.2 g of 2,6-bis(4-N,N-dimethylaminobenzylydene)cyclohexanone in the form of an orange crystal was obtained.

(2) 9.0 g of the 2,6-bis(4-N,N-dimethylaminobenzylydene) cyclohexanone was dissolved in a mixed solvent of 100 g of tetrahydrofurfurylalcohol and 150 g of tetrahydrofuran. To this was added 1.1 g of sodium borohydride. After the solution was heated for 8 hours at a temperature of from 30° C. to 45° C., a mixed solution of 4.8 g of p-toluenesulfonic acid-hydrate, 30 g of acetic acid and 35 ml of water was poured in the solution at room temperature. The precipitated dark green crystal was filtered out, washed with water and dried, to obtain 4.3 g of infrared absorbing agent IR-46.

Specific examples of the infrared absorbing agent represented by the above general formula (I) are given below. However, it must be noted that the infrared absorbing agent of the present invention is not limited to these specific examples.

IR-1

IR-2

IR-3

IR-4

IR-5

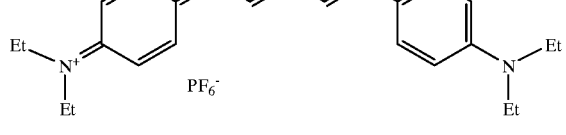

IR-6

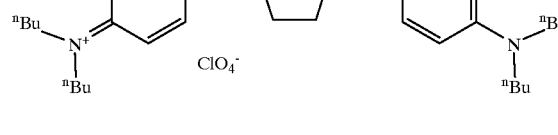

IR-7

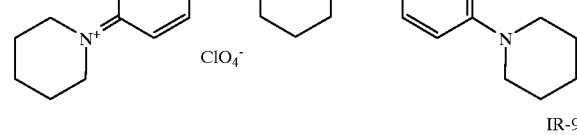

IR-8

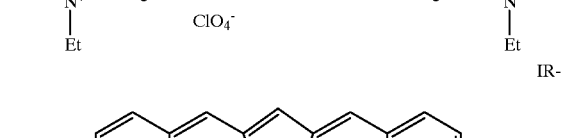

IR-9

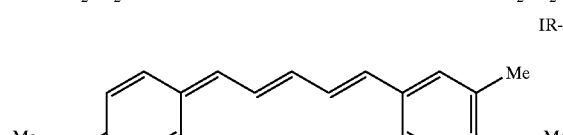

IR-10

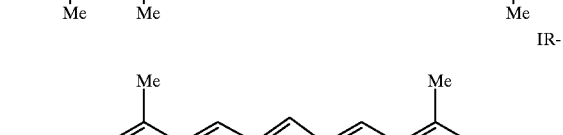

IR-11

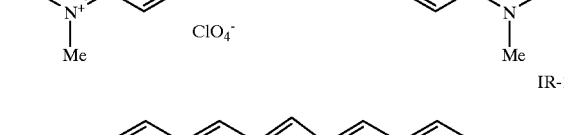

IR-12

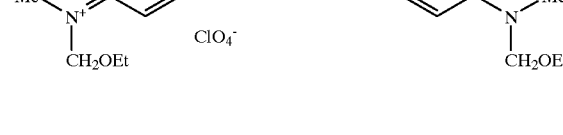

IR-13

-continued
IR-14
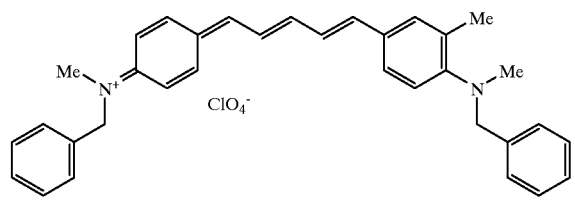
IR-15
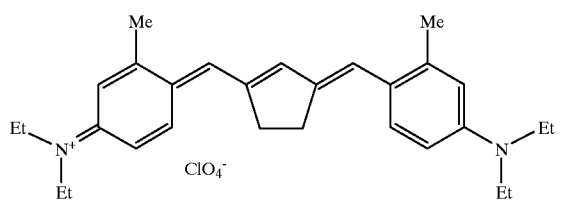
IR-16
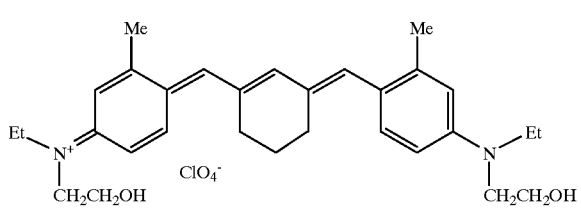
IR-17
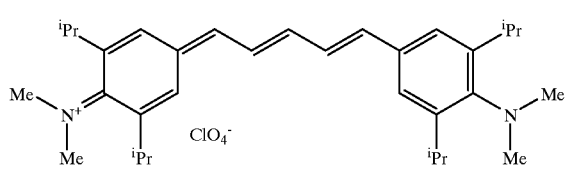
IR-18
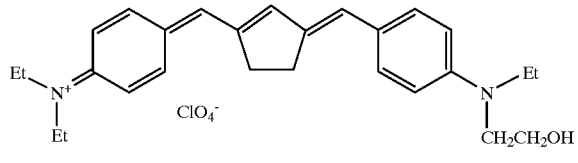
IR-19
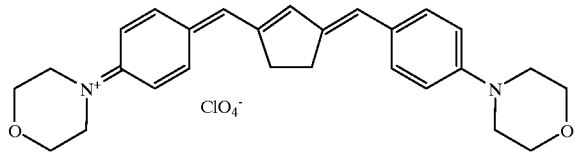
IR-20
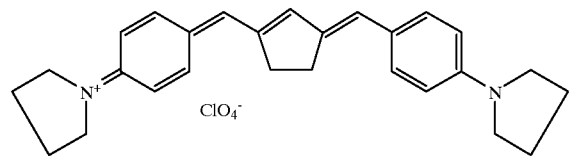
-continued
IR-21
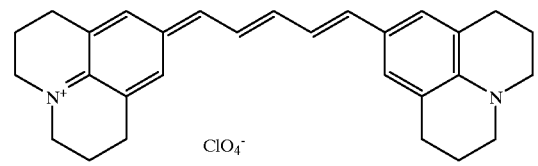
IR-22
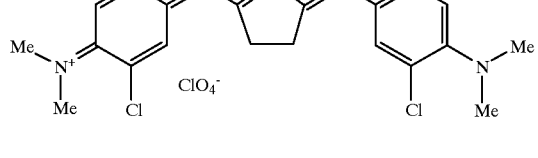
IR-23
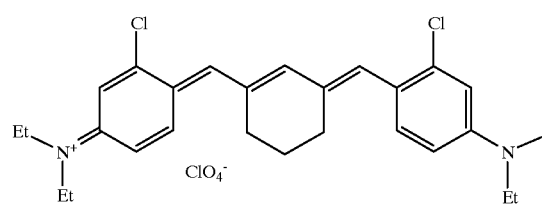
IR-24
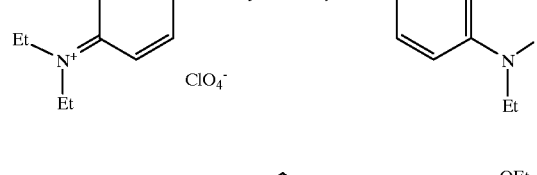
IR-25
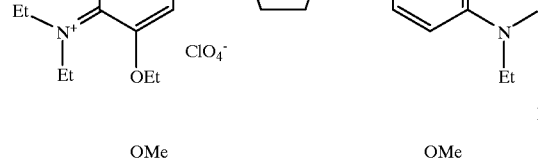
IR-26
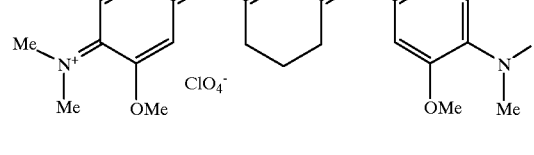
IR-27
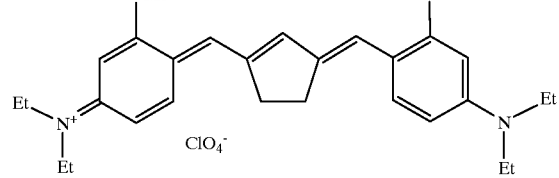

-continued
IR-28
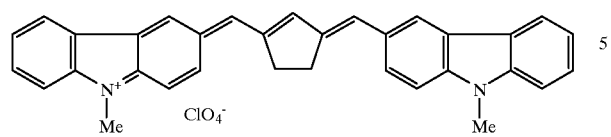
IR-29
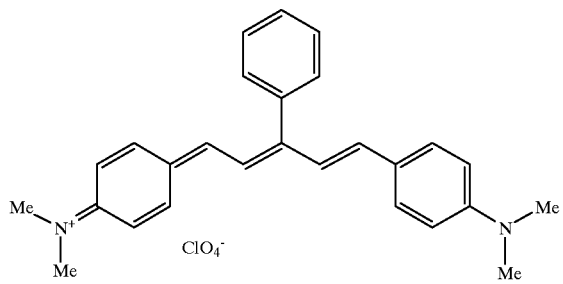
IR-30
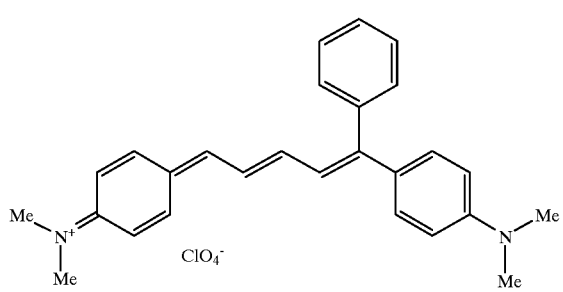
IR-31
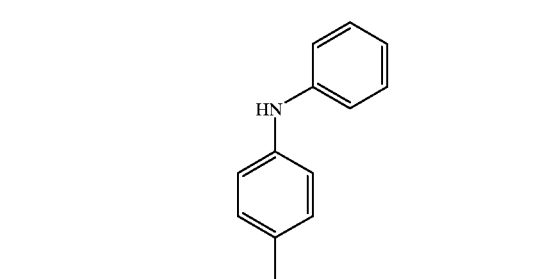
IR-32
-continued
IR-33
IR-34
IR-35
IR-36
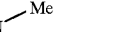
IR-37

IR-38
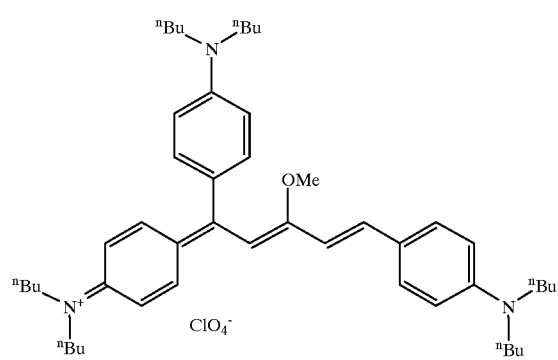
IR-39
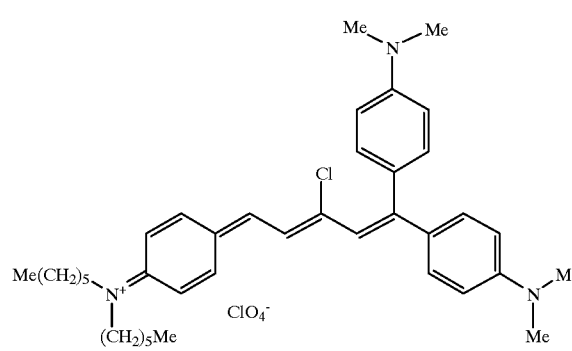
IR-40
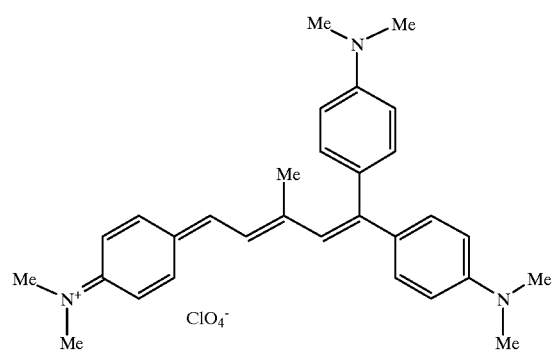
IR-41
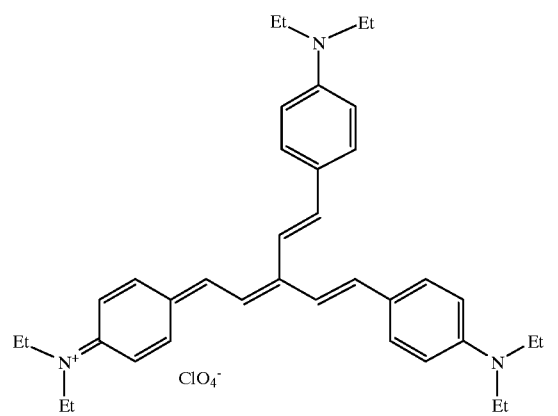
IR-42
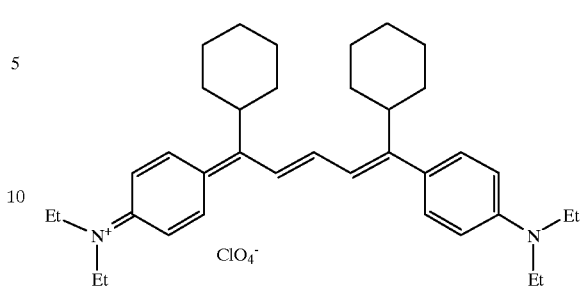
IR-43
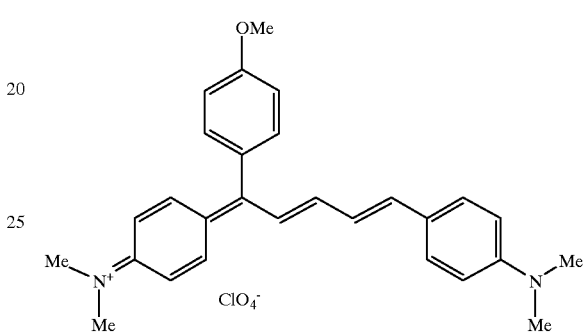
IR-44
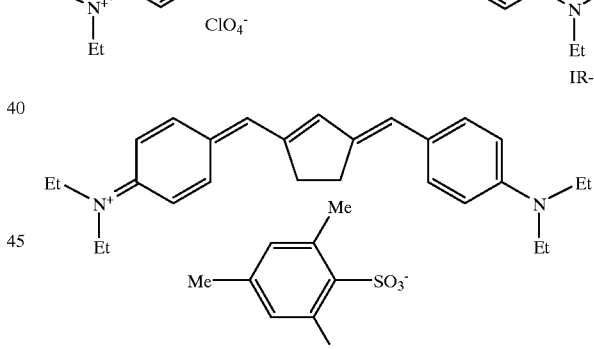
IR-45
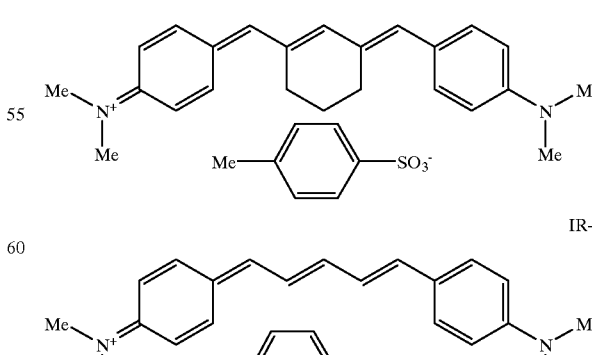
IR-46
IR-47
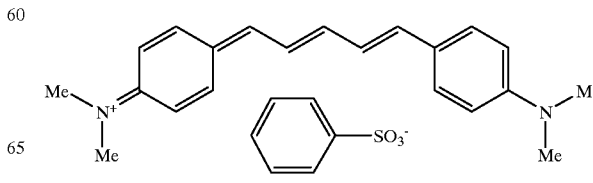

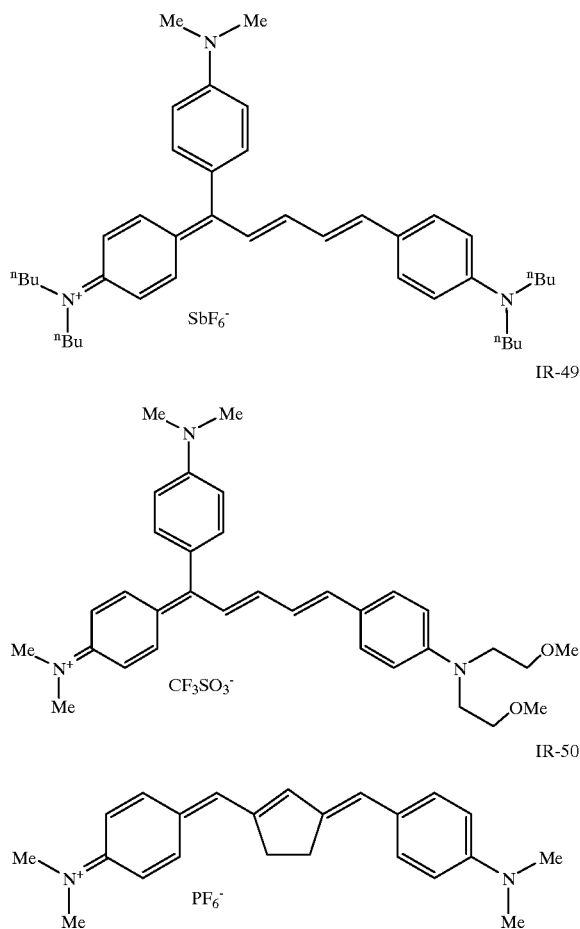

In the present invention, the amount added of the above infrared-ray absorbing agent is of 0.01 to 50% by weight, preferably of 0.1 to 20% by weight, and more preferably of 0.5 to 15% by weight, based on the total weight of the solids in the photosensitive composition. If the amount added is less than 0.01% by weight, the photosensitive composition cannot form an image, whereas, if the amount added is more than 50% by weight, non-image portions may be smudged when the composition is used as the photosensitive layer of a planographic printing plate precursor.

In addition to the infrared-ray absorbing agent, the photosensitive composition of the present invention may contain a pigment or dye capable of absorbing infrared rays, in order to improve the image-forming performance.

The pigments suitable for use in the present invention include commercially available pigments and the pigments described in "Color Index (C.I.) Handbook", "The Handbook of the Latest Pigments" (Saishin Ganryo Binran), edited by the Japan Association of Pigment Technologies (Nihon Ganryo Gijutsu Kyokai) (1977), "Latest Pigment Application Technologies" (Saishin Ganryo Oyo Gijutsu), CMC, 1986, and "Printing Ink Technologies" (Insatsu Inki Gijutsu), CMC, 1984.

Examples of the kinds of the pigments include black pigments, yellow pigments, orange pigments, brown pigments, red pigments, purple pigments, blue pigments, green pigments, fluorescent pigments, metal powder pigments, and polymers containing chemically combined dyes. Specific examples of the pigments include insoluble azo pigments, azo lake pigments, condensed azo pigments, chelated azo pigments, phthalocyanine-based pigments, anthraquinone-based pigments, perylene- and perinone-based pigments, thioindigo-based pigments, quinacridone-based pigments, dioxazine-based pigments, isoindolinone-based pigments, quinophthalone-based pigments, dyed lake pigments, azine pigments, nitroso pigments, nitro pigments, natural pigments, fluorescent pigments, inorganic pigments, carbon black, and the like.

These pigments may be used without being surface-treated or may be used after being surface-treated. Possible surface treatments include a treatment wherein a resin or a wax is coated on the surface of the pigment, a treatment wherein a surfactant is adhered to the surface of the pigment, and a treatment wherein a reactive substance (for example, silane coupling agent, an epoxy compound, or a polyisocyanate) is bound to the surface of the pigment. These surface-treating methods are described in "Properties and Applications of Metal Soaps" (Saiwai Shobo Co., Ltd.), "Printing Ink Technologies" (Insatsu Inki Gijutsu), CMC, 1984, and "Latest Pigment Application Technologies" (Saishin Ganryo Oyo Gijutsu), CMC, 1986.

The diameter of the pigments is preferably in the range of from 0.01 to 10 $\mu$m, more preferably in the range of from 0.05 to 1 $\mu$m, and most preferably in the range of from 0.1 to 1 $\mu$m. If the diameter is less than 0.1 $\mu$m, dispersion stability of the pigments in a coating liquid for the preparation of the photosensitive layer is insufficient, whereas, if the diameter is greater than 10 $\mu$m, uniformity of the photosensitive layer is poor.

A known dispersion technology employed in the preparation of ink, toners, and the like can also be used for the purpose of dispersing the pigments. Examples of dispersing machines include an ultrasonic dispersing machine, a sand mill, an attritor, a pearl mill, a super mill, a ball mill, an impeller, a disperser, a KD mill, a colloid mill, a dynatron, a three-roller mill, a pressurized kneader, and the like. Details of these dispersion technologies are described in "Latest Pigment Application Technologies" (Saishin Ganryo Oyo Gijutsu), CMC, 1986.

The dyes suitable for use in the present invention include commercially available dyes and dyes described in "Handbook of Dyes", edited by the Association of Organic Synthesis (Yuki Gosei Kagaku Kyokai) (1970). Specific examples of the dyes include azo dyes, azo dyes in the form of a metallic complex salt, pyrazolone azo dyes, anthraquinone dyes, phthalocyanine dyes, carbonium dyes, quinoneimine dyes, methine dyes, cyanine dyes, diimonium dyes, and aminium dyes.

Among these pigments and dyes, the pigments and dyes that absorb infrared or near-infrared rays are particularly preferable for use in the present invention, because of suitability for use in combination with a laser emitting infrared or near-infrared rays.

Carbon black may be used as the pigment that absorbs infrared or near-infrared rays suited for use in the present invention. Examples of the dyes that absorb infrared or near-infrared rays and are suited for use in the present invention include cyanine dyes described in, for example, JP-A Nos. 58-125,246, 59-84,356, 59-202,829, and 60-78, 787; methine dyes described in, for example, JP-A Nos. 58-173,696, 58-181,690 and 58-194,595; naphthoquinone dyes described in, for example, JP-A Nos. 58-112,793, 58-224,793, 59-48,187, 59-73,996, 60-52,940, and 60-63, 744; squarylium dyes described in, for example, JP-A No. 58-112,792; cyanine dyes described in U.K. Patent No. 434,875; and dihydropyrimidinesquarylium dyes described in U.S. Pat. No. 5,380,635.

Other compounds that can be suitably used as the dye include a near-infrared ray absorbing sensitizer described in U.S. Pat. No. 5,156,938. Also, particularly suitable compounds include: a substituted arylbenzo(thio)pyrylium salt described in U.S. Pat. No. 3,881,924; a trimethinethiopyrylium salt described in JP-A No. 57-142,645 (U.S. Pat. No. 4,327,169); pyrylium-based compounds described in JP-A Nos. 58-181,051, 58-220,143, 59-41,363, 59-84,248, 59-84,249, 59-146,063, and 59-146,061; a cyanine dye described in JP-A No. 59-216,146; a pentamethinethiopyrylium salt described in U.S. Pat. No. 4,283,475; pyrylium compounds described in Japanese Patent Application Publication (JP-B) Nos. 5-13,514 and 5-19,702; Epolight III-178, Epolight III-130, Epolight III-125, Epolight IV-62A, and the like.

Further examples of particularly preferred dyes include the near-infrared ray absorbing dyes represented by the formulae (I) and (II) described in U.S. Pat. No. 4,756,993.

In the present invention, the amount added of the pigment or dye is of 0.01 to 50% by weight, preferably of 0.1 to 10% by weight, most preferably of 0.5 to 10% by weight in the case of dye, and most preferably of 3.1 to 10% by weight in the case of pigment, based on the total weight of the solids in the materials for the printing plate. If the amount added of the pigment or dye is less than 0.01% by weight, sensitivity is poor, whereas, if the amount added is more than 50% by weight, uniformity of the photosensitive layer and durability of a recording layer become poor.

These dyes or pigments may be added to the photosensitive composition so that these dyes or pigments are added together with other components to the photosensitive layer, or alternatively may be added to a layer that contains these dyes or pigments formed in addition to the photosensitive layer when the planographic printing plate precursor is prepared.

(b) Polymeric compounds soluble in an aqueous alkaline solution

The term "(b) polymeric compounds soluble in an aqueous alkaline solution" used in the present invention means polymeric compounds having in a main chain or side chain thereof a group having acid group structures such as the following: namely, a phenolic hydroxyl group (—Ar—OH), carboxylic acid group (—COOH), sulfonic acid group (—SO$_3$H), phosphoric acid group (—OPO$_3$H), sulfonamide group (—SO$_2$NH—R), substituted sulfonamide-based acid group (active imido groups) (—SO$_2$NHCOR, —SO$_2$NHSO$_2$R, and —CONHSO$_2$R).

In these formulae, Ar represents a divalent aryl group which may have a substituent group, and R represents a hydrocarbon group which may have a substituent group.

Among these acid groups, preferable are (b-1) a phenolic hydroxyl group, (b-2) a sulfonamide group, and (b-3) an active imido group; and most preferable is (b-1) a resin that has a phenolic hydroxyl group and is soluble in an aqueous alkaline solution (this resin is hereinafter referred to as "a resin having a phenolic hydroxyl group").

Examples of the polymeric compounds having (b-1) a phenolic hydroxyl group include: novolac resins, such as a condensation polymerization product from phenol and formaldehyde (hereinafter referred to as a phenol/formaldehyde resin), a condensation polymerization product from m-cresol and formaldehyde (hereinafter referred to as a m-cresol/formaldehyde resin), a condensation polymerization product from p-cresol and formaldehyde, a condensation polymerization product from a m-cresol/p-cresol mixture and formaldehyde, and a condensation polymerization product from phenol, cresol (which may be m-cresol, p-cresol, or a mixture of m-cresol and p-cresol); and a condensation polymerization product from pyrogallol and acetone. Also usable are copolymers produced by copolymerization of monomers having a phenol group in a side chain. Examples of the monomers having a phenol group suited for use in the present invention include phenol group-containing acrylamide, methacrylamide, acrylate, methacrylate, hydroxystyrene, and the like. Specific preferred examples of these monomers include N-(2-hydroxyphenyl)acrylamide, N-(3-hydroxyphenyl)acrylamide, N-(4-hydroxyphenyl) acrylamide, N-(2-hydroxyphenyl)methacrylamide, N-(3-hydroxyphenyl)methacrylamide, N-(4-hydroxyphenyl) methacrylamide, o-hydroxyphenyl acrylate, m-hydroxyphenyl acrylate, p-hydroxyphenyl acrylate, o-hydroxyphenyl methacrylate, m-hydroxyphenyl methacrylate, p-hydroxyphenyl methacrylate, o-hydroxystyrene, m-hydroxystyrene, p-hydroxystyrene, 2-(2-hydroxyphenyl)ethyl acrylate, 2-(3-hydroxyphenyl) ethyl acrylate, 2-(4-hydroxyphenyl)ethyl acrylate, 2-(2-hydroxyphenyl)ethyl methacrylate, 2-(3-hydroxyphenyl) ethyl methacrylate, 2-(4-hydroxyphenyl)ethyl methacrylate, and the like. From the standpoint of image-forming performance, preferably the polymeric compound has a weight average molecular weight in the range of from $5.0 \times 10^2$ to $2.0 \times 10^4$ and a number average molecular weight in the range of from $2.0 \times 10^2$ to $1.0 \times 10^4$. These resins may be used singly or in a combination of two or more. In a case where a combination is used, any of these resins may be combined with a condensation polymerization product from a phenol substituted by an alkyl group having 3 to 8 carbon atoms and formaldehyde, such as a condensation polymerization product from t-butylphenol and formaldehyde or a condensation polymerization product from octylphenol and formaldehyde, as described in U.S. Pat. No. 4,123,279.

The weight average molecular weight of the resin having a phenolic hydroxyl group is preferably in the range of from 500 to 20,000. The number average molecular weight thereof is preferably in the range of from 200 to 10,000.

Further, as described in U.S. Pat. No. 4,123,279, resins, such as a t-butylphenol/formaldehyde resin and an octylphenol/formaldehyde resin, obtained by a condensation reaction between a phenol that is substituted by an alkyl group having 3 to 8 carbon atoms and formaldehyde, may be used in combination. These resins having a phenolic hydroxyl group may be used singly or in a combination of two or more.

In a case of a polymeric compound that has (b-2) a sulfonamide group and is soluble in alkaline water, examples of monomers having (b-2) a sulfonamide group, i.e., main monomers forming the polymeric compounds, include a monomer comprised of a compound that has a low molecular weight and has in a molecule thereof at least one sulfonamide group having at least one hydrogen atom linked to a nitrogen atom together with at least one unsaturated bond capable of polymerization. Among these monomers, preferable is a compound that has a low molecular weight and has an acryloyl group, an allyl group, or a vinyloxy group, together with a substituted or mono-substituted aminosulfonyl group or a substituted sulfonylimino group.

Examples of these compounds include the compounds represented by any of the following general formulae (3) to (7).

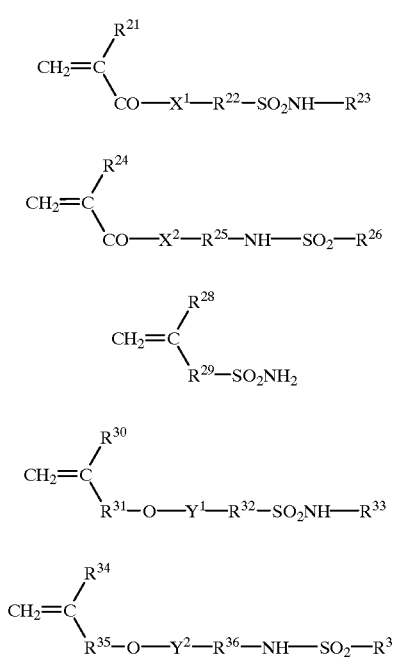

(3)
(4)
(5)
(6)
(7)

In the formulae, $X^1$ and $X^2$ each represent —O— or $R^{17}$—. $R^{21}$ and $R^{24}$ each represent a hydrogen atom or —$CH_3$. $R^{22}$, $R^{25}$, $R^{29}$, $R^{32}$ and $R^{36}$ each represent an alkylene group, a cycloalkylene group, an arylene group, or an aralkylene group, each group having 1 to 12 carbon atoms and possibly having a substituent group. $R^{23}$, $R^{17}$ and $R^{33}$ each represent a hydrogen atom, or alternatively an alkyl group, a cycloalkyl group, an aryl group, or an aralkyl group, each group having 1 to 12 carbon atoms and possibly having a substituent group. $R^{26}$ and $R^{37}$ each represent an alkyl group, a cycloalkyl group, an aryl group, or an aralkyl group, each group having 1 to 12 carbon atoms and possibly having a substituent group. $R^{28}$, $R^{30}$ and $R^{34}$ each represent a hydrogen atom or —$CH_3$. $R^{31}$ and $R^{35}$ each represent a single bond or alternatively an alkylene group, a cycloalkylene group, an arylene group, or an aralkylene group, each group having 1 to 12 carbon atoms and possibly having either a substituent group. $Y^1$ and $Y^2$ each represent a single bond or —CO—.

Preferred specific examples of the compounds include m-aminosulfonylphenyl methacrylate, N-(p-aminosulfonylphenyl)methacrylamide, and N-(p-aminosulfonylphenyl)acrylamide.

In a case of a polymeric compound that has (b-3) an active imido group and is soluble in an aqueous alkaline solution, examples of monomers having (b-3) an active imido group, i.e., main monomers forming the polymeric compounds, include a monomer comprised of a compound that has a low molecular weight and has in a molecule thereof at least one active imido group represented by the formula given below, together with at least one unsaturated bond capable of polymerization.

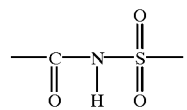

Preferred specific examples of the compounds include N-(p-toluenesulfonyl)methacrylamide and N-(p-toluenesulfonyl)acrylamide.

As a copolymer that is soluble in aqueous alkaline solution and can be used in the present invention, the copolymer does not need to be composed of a single kind of monomer selected from monomers having any of the (b-1) to (b-3) acid groups. Two or more kinds of monomers having the same acid group, or alternatively two or more kinds of monomers having different acid groups may also be used for copolymerization.

As for methods of copolymerizing the monomers, conventionally known methods such as graft polymerization, block polymerization, random polymerization, and the like can be used.

In the present invention, the copolymer includes in a percentage of preferably 10 mol % or more, more preferably 20 mol % or more, the copolymerization monomer(s) selected from the monomers having any of the (b-1) to (b-3) acid groups. If the copolymerizing component is less than 10 mol %, interaction between the resulting copolymer and the resin having a phenolic hydroxyl group is insufficient and thus an advantageous effect to be brought about by the use of the copolymerizing component, i.e., improvement in latitude in development, becomes insufficient.

The copolymer may include a copolymerizing component other than the monomer(s) selected from the monomers having any of the (b-1) to (b-3) acid groups.

Examples of monomers that can be used as the copolymerizing component include monomers of items (1) to (12) given below.

(1) acrylate esters and methacrylate esters which have each an aliphatic hydroxyl group and are exemplified by 2-hydroxyethyl acrylate, 2-hydroxyethyl methacrylate, and the like;

(2) alkyl acrylates such as methyl acrylate, ethyl acrylate, propyl acrylate, butyl acrylate, amyl acrylate, hexyl acrylate, octyl acrylate, benzyl acrylate, 2-chloroethyl acrylate, glycidyl acrylate, and N-dimethylaminoethyl acrylate;

(3) alkyl methacrylates such as methyl methacrylate, ethyl methacrylate, propyl methacrylate, butyl methacrylate, amyl methacrylate, hexyl methacrylate, cyclohexyl methacrylate, benzyl methacrylate, 2-chloroethyl methacrylate, glycidyl methacrylate and N-dimethylaminoethyl methacrylate;

(4) acrylamides or methacrylamides such as acrylamide, methacrylamide, N-methylolacrylamide, N-ethylacrylamide, N-hexyhnethacrylamide, N-cyclohexylacrylamide, N-hydroxyethylacrylamide, N-phenylacrylamide, N-nitrophenylacrylamide, and N-ethyl-N-phenylacrylamide;

(5) vinyl ethers such as ethyl vinyl ether, 2-chloroethyl vinyl ether, hydroxyethyl vinyl ether, propyl vinyl ether, butyl vinyl ether, octyl vinyl ether, and phenyl vinyl ether;

(6) vinyl esters such as vinyl acetate, vinyl chloroacetate, vinyl butylate, and vinyl benzoate;

(7) styrenes such as α-methylstyrene, methylstyrene, and chloromethylstyrene;

(8) vinyl ketones such as methyl vinyl ketone, ethyl vinyl ketone, propyl vinyl ketone, and phenyl vinyl ketone;

(9) olefins such as ethylene, propylene, isobutylene, butadiene, and isoprene;

(10) N-vinylpyrrolidone, N-vinylcarbazole, 4-vinylpyridine, acrylonitrile, and methacrylonitrile, and the like;

(11) unsaturated imides such as maleimide, N-acryloylacrylamide, N-acetylmethacrylamide, N-propionylmethacrylamide, and N-(p-chlorobenzoyl) methacrylamide; and

(12) unsaturated carboxylic acids such as acrylic acid, methacrylic acid, maleic anhydride, and itaconic acid.

In the present invention, from the standpoint of film strength, preferably the polymeric compound soluble in aqueous alkaline solution has a weight average molecular weight of 2,000 or more and a number average molecular weight of 500 or more, irrespective of whether the polymeric compound is a homopolymer or a copolymer. More preferably, the polymeric compound has a weight average molecular weight in the range of from 5,000 to 300,000, a number average molecular weight in the range of from 800 to 250,000, and an index of polydispersity (weight average molecular weight/number average molecular weight) in the range of from 1.1 to 10.

In the copolymer, from the standpoint of the latitude in development, the weight ratio of the monomer(s) having an acid group selected from the (b-1) to (b-3) acid groups to other monomer(s) is preferably in the range of from 50:50 to 5:95, and more preferably in the range of from 40:60 to 10:90.

In the present invention, the polymeric compounds soluble in aqueous alkaline solution may be used singly or in a combination of two or more. The amount added of the polymeric compound soluble in alkaline water is of 30 to 99% by weight, preferably of 40 to 95% by weight, and most preferably of 50 to 90% by weight, of the total weight of the solids of the photosensitive composition. If the amount added of the polymeric compound soluble in alkaline water is less than 30% by weight, the durability of the recording layer is poor, whereas, if the amount added of the polymeric compound soluble in alkaline water is more than 99% by weight, both sensitivity and durability are inferior.

Other Components:

A variety of additives may be incorporated into the photosensitive composition of the present invention, if necessary. For example, in order to inhibit more effectively the image portions from being dissolved in a developer, it is preferable to combine into the photosensitive composition a substance that is thermally decomposable and capable of substantially decreasing the solubility of the polymeric compound soluble in aqueous alkaline solution if the substance is not decomposed, such as an aromatic sulfone, an aromatic sulfonate ester, or the like.

In addition to these additives, cyclic acid anhydrides, phenols, and organic acids can also be used in order to increase further the sensitivity. Examples of the cyclic acid anhydrides include phthalic anhydride, tetrahydrophthalic anhydride, hexahydrophthalic anhydride, 3,6-endoxy-$\Delta^4$-tetrahydrophthalic anhydride, tetrachlorophthalic anhydride, maleic anhydride, chloromaleic anhydride, α-phenylmaleic anhydride, succinic anhydride, and pyromellitic anhydride, as described in U.S. Pat. No. 4,115,128. Examples of the phenols include bisphenol A, p-nitrophenol, p-ethoxyphenol, 2,4,4'-trihydroxybenzophenone, 2,3,4-trihydroxybenzophenone, 4-hydroxybenzophenone, 4,4',4''-trihydroxytriphenylmethane, and 4,4',3'',4''-tetrahydroxy-3,5,3',5'-tetramethyltriphenylmethane, and the like. Examples of the organic acids include sulfonic acids, sulfinic acids, alkylsulfuric acids, phosphonic acids, phosphates, and carboxylic acids, as described in, for example, JP-A Nos. 60-88,942 and 2-96,755. Specific examples of these organic acids include p-toluenesulfonic acid, dodecylbenzenesulfonic acid, p-toluenesulfinic acid, ethylsulfuric acid, phenylphosphonic acid, phenylphosphinic acid, phenyl phosphate, diphenyl phosphate, benzoic acid, isophthalic acid, adipic acid, p-toluic acid, 3,4-dimethoxybenzoic acid, phthalic acid, terephthalic acid, 4-cyclohexene-1,2-dicarboxylic acid, erucic acid, lauric acid, n-undecanoic acid, ascorbic acid, and the like.

The amount added of the cyclic acid anhydride, phenol, or organic acid is preferably in the range of from 0.05 to 20% by weight, more preferably in the range of from 0.1 to 15% by weight, and most preferably in the range of from 0.1 to 10% by weight, of the total weight of the solids of the materials for the printing plate.

Further, in order to broaden the stability of processing with respect to conditions of development, the materials for the printing plate according to the present invention may contain a nonionic surfactant as described in JP-A Nos. 62-251,740 and 3-208,514, or an amphoteric surfactant as described in JP-A Nos. 59-121,044 and 4-13,149.

Specific examples of the nonionic surfactant include sorbitan tristearate, sorbitan monopalmitate, sorbitan trioleate, stearic acid monoglyceride, polyoxyethylene nonylphenyl ether, and the like.

Specific examples of the amphoteric surfactant include alkyldi(aminoethyl)glycine, hydrochloric acid salt of alkylpolyaminoethylglycine, 2-alkyl-N-carboxyethyl-N-hydroxyethylimidazolinium betaine, N-tetradecyl-N,N-betaine (for example, Amogen K (tradename) manufactured by Dai-ichi Kogyo Seiyaku Co., Ltd.), and the like.

The preferred amount added of the nonionic surfactant or the amphoteric surfactant is in the range of from 0.05 to 15% by weight, more preferably from 0.1 to 5% by weight, of the total weight of the solids of the materials for the printing plate.

In the present invention, the material for the printing plate may contain a dye or a pigment as a printing-out agent which makes it possible to produce a visible image immediately after exposure-induced heating, or as an image coloring agent.

As a typical example of the printing-out agent, a combination of a compound that releases an acid by exposure-induced heating (i.e., a photoacid releasing agent) and an organic dye capable of forming a salt with the foregoing compound may be listed. Specific examples of the printing-out agent include a combination of o-naphthoquinonediazide-4-sulfonyl halogenide and an organic dye that forms a salt with this compound as described in JP-A Nos. 50-36,209 and 53-8,128, as well as a combination of a trihalomethyl compound and an organic dye that forms a salt with this compound as described in JP-A Nos. 53-36,223, 54-74,728, 60-3,626, 61-143,748, 61-151,644, and 63-58,440. Examples of the trihalomethyl compound include an oxazole-based compound and a triazine-based compound, both of which are effective in providing good storability over time and a clear printed-out image.

A dye other than the above-mentioned salt-forming organic dyes can also be used as the image coloring agent. Suitable dyes include oil-soluble dyes and basic dyes in addition to the salt-forming organic dyes. Specific examples of these dyes include Oil Yellow No. 101, Oil Yellow No. 103, Oil Pink No. 312, Oil Green BG, Oil Blue BOS, Oil Blue No. 603, Oil Black BY, Oil Black BS, and Oil Black T-505 (tradenames, all manufactured by Orient Chemical Industries, Co., Ltd.), Victoria Pure Blue BO (C.I.42595), Crystal Violet (C. I. 42555), Methyl Violet (C. I. 42535), Ethyl Violet (C. I. 42600), Rhodamine B (C. I. 145170B), Malachite Green (C. I. 42000), Methylene Blue (C. I. 52015), and the like. The dyes described in JP-A No. 62-293,247 are particularly preferable. The amount added of the dye may be in the range of from 0.01 to 10% by weight, preferably in the range of from 0.1 to 3% by weight, based on the total weight of the solids of the materials for the printing plate.

If necessary, in order to impart flexibility to a coating layer, a plasticizer may be added to the materials for the printing plate of the present invention. Examples of the plasticizer include butyl phthalyl butylglycolate, polyethylene glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate, an oligomer or a polymer of acrylic acid or methacrylic acid, and the like.

In addition to the above-described substances, other substances, which may also be added according to need, include an epoxy compound, a vinyl ether, a phenolic compound having a hydroxymethyl group and a phenolic compound having an alkoxymethyl group, as described in JP-A No.8-276,558, a cross-linking agent that inhibits the photosensitive composition from being dissolved in alkaline water and is described in U.S. application Ser. No. 09/200,734 previously filed by the present inventors, and the like.

The planographic printing plate precursor of the present invention can be prepared by coating an appropriate substrate with a photosensitive layer coating liquid containing the photosensitive composition, a coating liquid for a desired layer such as the protective layer, and the like, which are each prepared by dissolving the above-described components in a solvent. Some illustrative examples of the solvent include, but are not limited to, ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethylformamide, tetramethylurea, N-methylpyrrolidone, dimethyl sulfoxide, sulfolane, γ-butyrolactone, toluene, water, and the like. These solvents may be used singly or in a combination of two or more. The concentration of the components (total solids including additives) in the solvent is preferably in the range of from 1 to 50% by weight. The coated amount (solids) after coating and drying on the substrate varies according to usage, but the desirable amount is generally in the range of from 0.5 g to 5.0 g/m$^2$ for a photosensitive printing plate.

The coating liquid can be applied by various methods. Examples of the methods include bar coating, rotational coating, spraying, curtain coating, dipping, air-knife coating, blade coating, roll coating, and the like. As the coated amount decreases, the coat characteristics of the photosensitive layer becomes poor, although apparent sensitivity increases.

In order to improve coatability, the photosensitive layer coating liquid of the present invention may contain a surfactant. An example of this surfactant is a fluorine-based surfactant such as that described in JP-A No. 62-170,950. The preferred amount added of the surfactant is in the range of from 0.01 to 1% by weight, more preferably of from 0.05 to 0.5% by weight, based on the total weight of the materials for the printing plate.

The substrate which is used for the preparation of the planographic printing plate precursor in the present invention is a dimensionally stable plate. Specific examples of the substrate include paper, paper laminated with a plastic (for example, polyethylene, polypropylene, polystyrene, or the like), metal plates (such as aluminum, zinc, and copper), plastic films (such as diacetylcellulose, triacetylcellulose, cellulose propionate, cellulose butyrate, cellulose butyrate acetate, cellulose nitrate, polyethylene terephthalate, polyethylene, polystyrene, polypropylene, polycarbonate, and polyvinyl acetal), and paper or plastic films laminated or vapor-deposited with the above-mentioned metals.

Among these materials, a polyester film or an aluminum plate are preferable. The aluminum plate is particularly preferable, because it has good dimensional stability and is relatively cheap. Examples of the aluminum plate include a pure aluminum plate and a plate of an aluminum alloy containing aluminum as a main component together with traces of other elements. A further example of the substrate is a plastic film that is laminated or vapor-deposited with aluminum. Examples of the other elements that may be contained in the aluminum alloy include silicon, iron, manganese, copper, magnesium, chromium, zinc, bismuth, nickel, and titanium. The total included amount of the other elements in the aluminum alloy is 10% by weight or less. Although the aluminum particularly desirable for use in the present invention is pure aluminum, the aluminum to be used in the present invention may contain a small amount of other elements, because limitations in purification technologies make the production of perfectly pure aluminum difficult. Accordingly, the composition of the aluminum plate for use in the present invention is not particularly limited, and an aluminum plate of a conventionally known material may be used appropriately in the present invention. The thickness of the aluminum plate for use in the present invention is approximately of 0.1 to 0.6 mm, preferably of 0.15 to 0.4 mm, and most preferably of 0.2 to 0.3 mm.

Prior to surface-roughening the aluminum plate, if desired, a degreasing treatment is performed in order to remove rolling oil from the surface of the aluminum plate by means of, for example, a surfactant, an organic solvent, an aqueous alkaline solution, or the like.

Surface-roughening of the aluminum plate may be performed by a variety of methods. Examples of these methods include a method wherein the surface is mechanically roughened, a method wherein the surface is roughened by being electrochemically dissolved, and a method wherein the surface is chemically dissolved in a selective manner. The mechanical method may be a conventionally known method such as ball abrasion, brushing, blasting, and buffing. Exemplary of the electrochemical method is electrolysis of the aluminum plate in an electrolyte solution, such as a hydrochloric acid or a nitric acid, using an alternating current or a direct current. A combination of a mechanical method and an electrochemical method is also possible as described in JP-A No. 54-63,902.

If necessary, the surface-roughened aluminum plate is then subjected to an alkali-etching treatment and a neutralizing treatment. After that, if desired, the aluminum plate is subjected to an anodizing treatment so as to increase water retention and wear resistance of the surface. A variety of electrolytes capable of producing a porous oxide layer can be used as an electrolyte for the anodizing treatment of the aluminum plate generally, sulfuric acid, phosphoric acid, oxalic acid, chromic acid, or a mixture of these acids can be used as the electrolyte. The concentration of the electrolyte may be determined appropriately, depending on the type of the electrolyte Conditions for anodizing vary depending on the type of electrolyte employed and cannot be stipulated unqualifiedly.

However, generally employed conditions are as follows: the concentration of the electrolyte solution is of from 1 to 80% by weight; the temperature of the solution is of from 5 to 70° C.; the current density is of from 5 to 60 A/dm$^2$; the voltage is of from 1 to 100V; and the duration of the electrolysis is of from 10 seconds to 5 minutes.

If the amount of the anodized layer is less than 1.0 g/m$^2$, the surface has poor printing durability and the non-image portions of the resulting planographic printing plate are liable to form scratch marks, which collect printing ink during printing to cause so-called scratch smudging.

If necessary, the substrate whose surface has already been anodized may be rendered hydrophilic by a surface treatment. Preferred examples of this hydrophilizing surface treatment include treating the surface with an aqueous solution of an alkali metal silicate (such as sodium silicate) as described in U.S. Pat. Nos. 2,714,066, 3,181,461, 3,280,734, and 3,902,734, wherein the substrate is simply immersed or electrolytically treated in an aqueous solution of sodium silicate. Further examples are a treatment of the surface with a potassium fluorozirconate as described in JP-B No. 36-22,063 and a treatment of the surface with a polyvinylsulfonic acid as described in U.S. Pat. Nos. 3,276,868, 4,153,461 and 4,689,272.

The planographic printing plate precursor of the present invention is prepared by forming a positive-type photosensitive layer containing the photosensitive composition of the present invention on the substrate. If necessary, an undercoat may be formed between the foregoing layer and the substrate.

Various organic compounds may be used as components of the undercoat. For example, an organic compound constituting the undercoat may be selected from the group consisting of: carboxymethyl cellulose; dextrin; gum arabic; phosphonic acids having an amino group such as 2-aminoethylphosphonic acid and the like; organic phosphonic acids such as phenylphosphonic acid, naphthylphosphonic acid, alkylphosphonic acid, glycerophosphonic acid, methylenediphosphonic acid, ethylenediphosphonic acid, and the like, which may each have a substituent group; organic phosphoric acids such as phenylphosphoric acid, naphthylphosphoric acid, alkylphosphoric acid, glycerophosphoric acid, and the like, which may each have a substituent group; organic phosphinic acids such as phenylphosphinic, naphthylphosphinic acid, alkylphosphinic acid, glycerophosphinic acid, and the like, which may each have a substituent group; amino acids such as glycine, β-alanine, and the like; and hydrochloric acid salts of amines having a hydroxyl group such as triethanolamine and the like. These compounds may be used singly or may be used in a combination of two or more.

The organic undercoat may be formed by any method described below. For example, the organic compound is dissolved in water, an organic solvent such as methanol, ethanol, or methyl ethyl ketone, or in a mixture thereof, to prepare a coating solution, and thereafter the coating solution is coated on an aluminum plate to provide a layer which is then dried. Alternatively, the organic compound is dissolved in water, an organic solvent such as methanol, ethanol, or methyl ethyl ketone, or in a mixture thereof to prepare a coating solution, and thereafter an aluminum plate is immersed in the coating solution so that the organic compound is adsorbed on the surface of the aluminum plate to thereby form a layer which is then rinsed with water or the like and dried. When the former method is employed, a solution containing the organic compound in an amount of 0.005 to 10% by weight can be applied by a variety of methods. When the latter method is employed, the parameters of the conditions are as follows: the concentration of the solution is of from 0.01 to 20% by weight and preferably of from 0.05 to 5% by weight; the immersion temperature is of from 20 to 90° C. and preferably of from 25 to 50° C.; and the immersion time is of from 0.1 seconds to 20 minutes and preferably of from 2 seconds to 1 minute. The pH of the solution may be adjusted to a value within the range of from 1 to 12 by use of a base such as ammonia, triethylamine or potassium hydroxide, or an acid such as hydrochloric acid or phosphoric acid. Further a yellow dye may be added into the coating solution so as to improve the reproducibility of the surface characteristics of the planographic printing plate precursor.

The desirable coated amount after drying of the organic undercoat is in the range of from 2 to 200 mg/m$^2$ and preferably in the range of from 5 to 100 mg/m$^2$. If the coated amount is less than from 2 mg/m$^2$, sufficient printing durability may not be obtained. On the other hand, if the coated amount exceeds 200 mg/m$^2$, the same undesirable result may occur.

The positive-type planographic printing plate precursor thus obtained is usually subjected to image-wise exposure and development.

Examples of a light source of active rays to be used for the image-wise exposure include mercury lamps, metal halide lamps, xenon lamps, chemical lamps, and carbon arc lamps. Examples of radiation rays include electron beams, X-rays, ion beams, and far-infrared rays. Further, g-rays, i-rays, deep-UV rays, and high-density energy beams (laser beams) can also be used. Examples of the laser beams include helium/neon lasers, argon lasers, krypton lasers, helium/cadmium lasers, and Kr/F excimer lasers, solid-state lasers, semiconductor lasers, and the like.

In the present invention, a light source emitting light whose wavelength ranges from a near-infrared region to a far-infrared region is preferable, and a solid-state laser and a semiconductor laser are particularly preferable.

A conventionally known aqueous alkaline solution can be used as a developer and also as a replenisher solution for the planographic printing plate precursor of the present invention. For example, the aqueous alkaline solution may comprise an inorganic alkali salt such as sodium silicate, potassium silicate, sodium tertiary phosphate, potassium tertiary phosphate, ammonium tertiary phosphate, sodium secondary phosphate, potassium secondary phosphate, ammonium secondary phosphate, sodium carbonate, potassium carbonate, ammonium carbonate, sodium hydrogencarbonate, potassium hydrogencarbonate, ammonium hydrogencarbonate, sodium borate, potassium borate, ammonium borate, sodium hydroxide, ammonium hydroxide, potassium hydroxide, or lithium hydroxide. In addition, an organic alkali can also be used for the preparation of the aqueous alkaline solution. Examples of the organic alkali include monomethylamine, dimethylamine, trimethylamine, monoethylamine, diethylamine, triethylamine, monoisopropylamine, diisopropylamine, triisopropylamine, n-butylamine, monoethanolamine, diethanolamine, triethanolamine, monoisopropanolamine, diisopropanolamine, ethyleneimine, ethylenediamine, and pyridine.

These alkalis may be used singly or in a combination of two or more.

A particularly preferred developer is an aqueous solution of a silicate, such as sodium silicate, potassium silicate, or the like, among the above-mentioned alkalis. This is because adjustment of developing performance of the developer is possible by varying the ratio of silicon oxide $SiO_2$ to alkali metal oxide $M_2O$, each of which is an element of the silicate, and by varying the concentrations thereof in the solution. For example, using alkali metal silicates described in JP-A No. 54-62,004 and JP-B No. 57-7,427 is effective in the present invention.

As is generally known, when an automatic processor is used, a conventionally employed replenishing system can process a large amount of PS plates without changing the developer in a tank for a long period of time by feeding the tank with an aqueous solution (a replenisher solution) having an alkali strength higher than that of the developer in the tank. This replenishing system is also suitable for the present invention. If necessary, the developer and the replenisher solution may contain a surfactant or an organic solvent for such purposes as acceleration or retardation of development, dispersion of sludge resulting from development, and enhancement of the affinity of the image portions of the printing plate for ink. Examples of preferred surfactants include anionic surfactants, cationic surfactants, nonionic surfactants, and amphoteric surfactants.

Further, if necessary, the developer and the replenisher solution may contain: a reducing agent such as hydroquinone, resorcinol, and a salt of an inorganic acid, for example, sodium or potassium sulfite and sodium or potassium hydrogensulfite; an organic carboxylic acid; a defoaming agent; and an agent to convert hard water into soft water.

The printing plate, after being processed with the developer and the replenisher solution described above, is subjected to a post-treatment such as a treatment with rinsing water, a treatment with a rinsing solution containing a surfactant or the like, or a treatment with a desensitizing solution containing gum arabic or a starch derivative. A combination of these treatments may be employed as the post-treatment when the planographic printing original plate of the present invention is used as a printing plate.

In recent years, for the purpose of rationalization and standardization of plate production, automatic processors have been widely used in the processing of materials for printing plates in the plate production and printing industries. Generally, the automatic processor is comprised of a developing portion and a post-treatment portion, each comprising a device for transferring a printing plate and a tank filled with a processing solution and equipped with a spraying device, wherein the printing plate after exposure travels horizontally so that it is developed by the processing solutions which are sprayed from nozzles after being pumped up from the tanks, respectively. Further, according to a new process, a printing plate is immersed in and transferred through a processing tank filled with a processing solution by means of immersed guide rolls or the like. With these kinds of automated processing, processing can be performed by supplying replenisher solutions to each of the processing solutions, in amounts in accordance with the processed volume, the period of time of operation, or the like.

Further, a so-called single-use treatment system, in which a printing plate is processed with a substantially unused processing solution, can also be employed in the present invention.

Details of the photosensitive planographic printing plate precursor using the photosensitive composition of the present invention are given below. If unnecessary image portions (for example, film edge marks of an original film) are found on the planographic printing plate, which has been obtained by a procedure comprising image-wise exposure, developing, water-washing and/or rinsing, and/or gum coating, the unnecessary image portions are erased. Erasure is preferably performed by a process comprising coating the unnecessary image portions with an erasing solution, leaving the coating on the unnecessary image portions for a predetermined period of time, and then removing the coating by washing with water, as described in JP-B No. 2-13,293. In addition to this process, a process comprising irradiating the unnecessary image portions with active rays from an optical fiber and then carrying out development, as described in JP-A No. 59-174,842, may also be used.

The planographic printing plate thus obtained is coated with a desensitizing gum, if necessary, and can be used in a printing process. However, if it is desired to impart a higher level of printing durability to the printing plate, the printing plate is subjected to a burning treatment.

If the printing plate undergoes the burning treatment, it is desirable to treat the printing plate with a surface-adjusting solution, which is described in, for example, JP-B Nos. 61-2,518 and 55-28,062, and JP-A Nos. 62-31,859 and 61-159,655, prior to the burning treatment.

According to these treatment methods, the planographic printing plate is coated with a surface-adjusting solution by using a sponge or absorbent cotton soaked with the solution; the planographic printing plate is immersed in a vat filled with the surface-adjusting solution; or the planographic printing plate is coated with the surface-adjusting solution by using an automated coater. If the coated amount is homogenized by means of using a squeegee or a squeegee roller after coating, a better result is obtained.

The suitable coated amount of the surface-adjusting solution is generally in the range of from 0.03 to 0.8 mg/m$^2$ (dry weight).

The planographic printing plate after being coated with the surface-adjusting solution is dried and thereafter heated to a high temperature, if necessary, by means of a burning processor (for example, Burning Processor BP-1300, trade name, manufactured by Fuji Film Co., Ltd.). The temperature and time vary depending on the kinds of the components forming the image, but ranges of from 180 to 300° C. and of from 1 to 20 minutes, respectively, are preferable.

After the burning treatment, if necessary, the planographic printing plate may be subjected to conventionally employed treatments such as water-rinsing and gum-coating. However, if the surface-adjusting solution contains a water-soluble polymeric compound or the like, so-called desensitizing treatments such as gum-coating may be omitted.

The planographic printing plate thus prepared is mounted on an offset printing machine or the like and is then used for printing a large number of sheets.

EXAMPLES

The present invention is explained below by way of examples. However, it must be noted that the scope of the present invention is not limited to these examples.

Examples 1 to 4

Preparation of Substrates

A 0.30 mm thick aluminum plate (type of material: 1050) was cleaned with trichloroethylene and roughened with a nylon brush and an aqueous suspension of 400 mesh pumice powder. After being rinsed well with water, the aluminum plate was etched by a process comprising the steps of immersing the aluminum plate in an aqueous solution of 25% sodium hydroxide at 45° C. for 9 seconds, rinsing the aluminum plate with water, immersing the aluminum plate in a aqueous solution of 20% nitric acid for 20 seconds, and rinsing the aluminum plate with water. In the process, the etched amount of the grained aluminum plate was about 3 g/m². Next, the aluminum plate was subjected to an anodizing process comprising immersing the aluminum plate in a 7% sulfuric acid solution as an electrolyte solution through which a direct current with a density of 15 A dm² was passed. This process produced an anodized film of 3 g/m². Then, the surface-treated aluminum plate was rinsed with water and thereafter dried. The aluminum plate was then coated with an undercoat fluid described below, and the coated layer was dried at 90° C. for 1 minute. After drying, the coated amount of the coated layer was 10 mg/m².

| Composition of undercoat fluid: | |
| --- | --- |
| β-alanine | 0.5 g |
| methanol | 95 g |
| water | 5 g |

On the other hand, photosensitive liquids were prepared according to the following base formulation of a photosensitive liquid 1 by replacing the infrared-ray absorbing agent with those shown in Table 1, respectively. The photosensitive liquids thus prepared were each coated on the substrates obtained with the above-described procedure, in a coated amount of 1.8 g/m². In this way, planographic printing plate precursors of Examples 1 to 4 were obtained.

| Composition of photosensitive liquid 1 | in grams |
| --- | --- |
| m-Cresol/p-cresol novolac resin (m to p ratio: 6:4; weight average molecular weight: 3,500; content of unreacted cresol: 0.5% by weight) *polymeric compound soluble in alkaline water | 1.0 |
| Infrared-ray absorbing agent shown in Table 1 *compound represented by the general formula (I) | 0.2 |
| Dye prepared by using 1-naphthalenesulfonic acid anion as the counter anion of Victoria Pure Blue BOH | 0.02 |
| Fluorine-based surfactant (Megafac F-177 manufactured by Dainippon Ink and Chemicals Inc.) | 0.05 |
| γ-Butyrolactone | 3 |
| Methyl ethyl ketone | 8 |
| 1-Methoxy-2-propanol | 7 |

Examples 5 to 8
Synthesis of a Copolymer as a Polymeric Compound Soluble in an Aqueous Alkaline Solution Synthesis Example
(Copolymer 1)

31.0 g (0.36 mol) of methacrylic acid, 39.1 g (0.36 mol) of ethyl chloroformate, and 200 ml of acetonitrile were placed in a 500 ml, three-neck flask fitted with a stirrer, a condenser tube, and a dropping funnel. The resulting reaction mixture was stirred while being cooled on an ice water bath. Then, 36.4 g (0.36 mol) of triethylamine was added dropwise from the dropping funnel to the reaction mixture over a period of about 1 hour. Upon completing the addition, the ice water bath was removed and the reaction mixture was stirred at room temperature for 30 minutes.

Next, 51.7 g (0.30 mol) of p-aminobenzenesulfonamide was added to the reaction mixture, and the reaction mixture was stirred at 70° C. on an oil bath for about 1 hour. After the reaction, the reaction mixture was poured into 1 liter of water while the water was stirred, and the resulting mixture was stirred for 30 minutes. The mixture was filtered to collect a precipitate, which was slurried in 500 ml of water. The slurry was filtered to obtain a solid, which was then dried. The white solid substance thus obtained was N-(p-aminosulfonylphenyl)methacrylamide (the yield was 46.9 g).

Then, 5.04 g (0.0210 mol) of N-(p-aminosulfonylphenyl) methacrylamide, 2.05 g (0.0180 mol) of ethyl methacrylate, 1.11 g (0.021 mol) of acrylonitrile, and 20 g of N,N-dimethylacetamide were placed in a 100 ml, three-neck flask fitted with a stirrer, a condenser tube, and a dropping funnel. The resulting reaction mixture was stirred at 65° C. on a warm water bath. To the reaction mixture was added 0.15 g of V-65 (manufactured by Wako Pure Chemical Industries, Ltd.), and the reaction mixture was stirred while being kept at 65° C. for 2 hours under a nitrogen stream. Further, a mixture of 5.04 g of N-(p-aminosulfonylphenyl) methacrylamide, 2.05 g of ethyl methacrylate, 1.11 g of acrylonitrile, 20 g of N,N-dimethylacetamide, and 0.15 g of V-65 was added dropwise from the dropping funnel to the reaction mixture over a period of 2 hours. Upon completing the addition, the reaction mixture was stirred at 65° C. for an additional 2 hours. After the reaction, 40 g of methanol was added to the reaction mixture, and the mixture was poured into 2 liters of water while the water was stirred, and the resulting mixture was stirred for 30 minutes. The mixture was filtered to collect a precipitate, which was then dried. In this way, 15 g of a white solid substance was obtained, and this substance was designated as copolymer 1. The weight average molecular weight (using polystyrene as a standard) of the copolymer 1 was 53,000 according to gel permeation chromatography.

On the other hand, photosensitive liquids were prepared according to the following base formulation of a photosensitive liquid 2 by replacing the infrared-ray absorbing agent with those shown in Table 1, respectively. The photosensitive liquids thus prepared were each coated on the substrates obtained in Examples 1 to 4, in a coated amount of 1.8 g/m². In this way, planographic printing plate precursors of Examples 5 to 8 were obtained.

| Composition of photosensitive liquid 2 | in grams |
| --- | --- |
| Copolymer 1 | 1.0 |
| Infrared-ray absorbing agent shown in Table 2 *compound represented by the general formula (I) | 0.1 |
| p-Toluenesulfonic acid | 0.002 |
| Dye prepared by using 1-naphthalenesulfonic acid anion as the counter anion of Victoria Pure Blue BOH | 0.02 |
| Fluorine-based surfactant (Megafac F-177 manufactured by Dainippon Ink and Chemicals Inc.) | 0.05 |
| γ-Butyrolactone | 8 |
| Methyl ethyl ketone | 8 |
| 1-Methoxy-2-propanol | 4 |

Comparative Examples 1 to 2

Planographic printing plate precursors of Comparative Examples 1 to 2 were obtained by repeating the procedure of Example 1, except that the infrared-ray absorbing agent represented by the general formula (I) in the photosensitive liquid 1 was replaced with infrared-ray absorbing agents B-1 and B-2 represented by the following structural formulae, respectively.

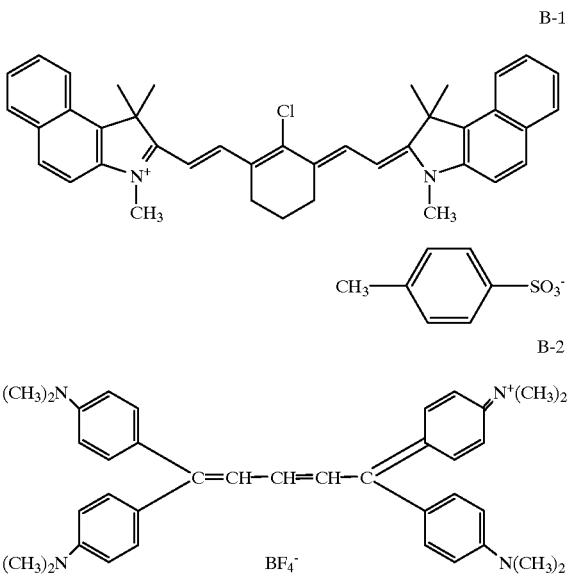

Comparative Examples 3 to 4

Planographic printing plate precursors of Comparative Examples 3 to 4 were obtained by repeating the procedure of Example 5, except that the infrared-ray absorbing agent represented by the general formula (I) in the photosensitive liquid 2 was replaced with infrared-ray absorbing agents B-1 and B-2 represented by the above-described structural formulae, respectively.

Examples 9 to 12

Synthesis Example (Copolymer 2)

31.0 g (0.36 mol) of methacrylic acid, 39.1 g (0.36 mol) of ethyl chloroformate, and 200 ml of acetonitrile were placed in a 500 ml, three-neck flask fitted with a stirrer, a condenser tube, and a dropping funnel. The resulting reaction mixture was stirred while being cooled on an ice water bath. Then, 36.4 g (0.36 mol) of triethylamine was added dropwise from the dropping funnel to the reaction mixture over a period of about 1 hour. Upon completing the addition, the ice water bath was removed and the reaction mixture was stirred at room temperature for 30 minutes.

Next, 51.7 g (0.30 mol) of p-aminobenzenesulfonamide was added to the reaction mixture, and the reaction mixture was stirred at 70° C. on an oil bath for 1 hour. After the reaction, the reaction mixture was poured into 1 liter of water while the water was stirred, and the resulting mixture was stirred for 30 minutes. The mixture was filtered to collect a precipitate, which was slurried in 500 ml of water. The slurry was filtered to obtain a solid, which were then dried. The white solid substance thus obtained was N-(p-aminosulfonylphenyl)methacrylamide (the yield was 46.9 g).

Then, 4.61 g (0.0192 mol) of N-(p-aminosulfonylphenyl) methacrylamide, 2.94 g (0.0258 mol) of ethyl methacrylate, 0.80 g (0.015 mol) of acrylonitrile, and 20 g of N,N-dimethylacetamide were placed in a 20 ml, three-neck flask fitted with a stirrer, a condenser tube, and a dropping funnel. The resulting reaction mixture was stirred at 65° C. on a warm water bath. To the reaction mixture was added 0.15 g of V-65 (manufactured by Wako Pure Chemical Industries, Ltd.), and the reaction mixture was stirred while being kept at 65° C. for 2 hours under a nitrogen stream. Further, a mixture of 4.61 g of N-(p-aminosulfonylphenyl) methacrylamide, 2.94 g of ethyl methacrylate, 0.80 g of acrylonitrile, and a mixture of 20 g of N,N-dimethylacetamide and 0.15 g of V-65 was added dropwise from the dropping funnel to the reaction mixture over a period of 2 hours. Upon completing the addition, the reaction mixture was stirred at 65° C. for an additional 2 hours. After the reaction, 40 g of methanol was added to the reaction mixture, and the mixture was poured into 2 liters of water while the water was stirred, and the resulting mixture was stirred for 30 minutes. The mixture was filtered to collect a precipitate, which was then dried. In this way, 15 g of a white solid substance was obtained, and this substance was designated as copolymer 2. The weight average molecular weight (using polystyrene as a standard) of the copolymer 2 was 53,000 according to gel permeation chromatography.

On the other hand, photosensitive liquids were prepared according to the following base formulation of a photosensitive liquid 3 by replacing the infrared-ray absorbing agent with those shown in Table 1, respectively. The photosensitive liquids thus prepared were each coated on the substrates obtained in Examples 1 to 4 in a coated amount of 1.8 g/m². In this way, planographic printing plate precursors of Examples 9 to 12 were obtained.

| Composition of photosensitive liquid 3 | in grams |
|---|---|
| Copolymer 2 | 0.75 |
| m-Cresol/p-cresol novolac resin (m to p ratio: 6:4; weight average molecular weight: 3,500; content of unreacted cresol: 0.5% by weight) | 0.25 |
| Tetrahydrophthalic anhydride | 0.03 |
| Infrared-ray absorbing agent shown in Table 3 *compound represented by the general formula (I) | 0.017 |
| Dye prepared by using 1-naphthalenesulfonic acid anion as the counter anion of Victoria Pure Blue BOH | 0.015 |
| Fluorine-based surfactant (Megafac F-177 manufactured by Dainippon Ink and Chemicals Inc.) | 0.05 |
| γ-Butyrolactone | 10 |
| Methyl ethyl ketone | 10 |
| 1-Methoxy-2-propanol | 1 |

Comparative Examples 5 to 6

Planographic printing plate precursors of Comparative Examples 5 to 6 were obtained by repeating the procedure of Example 9, except that the infrared-ray absorbing agent represented by the general formula (I) in the photosensitive liquid 3 was replaced with infrared-ray absorbing agents B-1 and B-2 represented by the previously described structural formulae, respectively.

Evaluation of the Planographic Printing Plate Precursors

The planographic printing plate precursors of Examples 1 to 12 and the planographic printing plate precursors of Comparative Examples 1 to 6 obtained in the above manner were subjected to the following tests to evaluate performance. Test results are shown in Table 1.

Image-forming Performance: Evaluation of Sensitivity and Latitude in Development The obtained planographic printing plate precursors were exposed with a semiconductor laser having a wavelength of 840 nm. The exposed plates were developed by using an automatic processor (PS Processor 900 VR manufactured by Fuji Film Co., Ltd.) fed with a developer DP-4 and a rinsing solution FR-3 (1:7), all manufactured by Fuji Film Co., Ltd. In this test, two dilution levels were employed when diluting DP-4 with water, namely, a 1:6 dilution level and a 1:12 dilution level. For each of the two dilution levels of the developer, the line width in the obtained non-image portions was measured. Next, the amount of laser energy radiation corresponding to the line width was calculated, and this amount was designated as the sensitivity. The difference between the sensitivity for the dilution of 1:6, which is standard, and the dilution of 1:12 was recorded. A planographic printing plate precursor that exhibits a smaller difference was judged to have better latitude in development. A difference of 20 mJ/cm$^2$ or less indicated a level that was practicable.

Evaluation of Stability

The obtained planographic printing plate precursors were stored at 60° C. for 3 days, and then exposed to a laser and developed as in the above-described test. The sensitivity was measured in the same way as described above. The difference in sensitivity between before and after storage was calculated. A planographic printing plate precursor that exhibits a difference of 20 mJ/cm$^2$ or less was judged to have good storage stability and to be of a practicable level.

TABLE 1

| | Infrared-ray absorbing agent | Molecular weight of Infrared-ray absorbing agent | Sensitivity (mJ/cm$^2$) | Latitude in development (mJ/cm$^2$) | Storage stability |
|---|---|---|---|---|---|
| Ex.* 1 | IR-5 | 474 | 110 | 10 | Good |
| Ex.* 2 | IR-18 | 503 | 120 | 5 | Good |
| Ex.* 3 | IR-30 | 481 | 110 | 10 | Good |
| Ex.* 4 | IR-46 | 517 | 120 | 10 | Good |
| Ex.* 5 | IR-5 | 474 | 110 | 5 | Good |
| Ex.* 6 | IR-18 | 503 | 120 | 5 | Good |
| Ex.* 7 | IR-30 | 481 | 115 | 10 | Good |
| Ex.* 8 | IR-46 | 517 | 120 | 5 | Good |
| Ex.* 9 | IR-5 | 474 | 105 | 5 | Good |
| Ex.* 10 | IR-18 | 503 | 110 | 10 | Good |
| Ex.* 11 | IR-30 | 481 | 120 | 5 | Good |
| Ex.* 12 | IR-46 | 517 | 115 | 5 | Good |
| Comp.** 1 | B-1 | 755 | 135 | 25 | Good |
| Comp.** 2 | B-2 | 631 | 130 | 25 | Good |
| Comp.** 3 | B-1 | 755 | 135 | 25 | Good |
| Comp.** 4 | B-2 | 631 | 135 | 25 | Good |
| Comp.** 5 | B-1 | 755 | 135 | 25 | Good |
| Comp.** 6 | B-2 | 631 | 130 | 25 | Good |

Ex.*: Example
Comp. Ex.**: Comparative Example

As seen in Table 1, all of the planographic printing plates of Examples 1 to 12 had a higher sensitivity to an infrared laser in comparison with the planographic printing plates of Comparative Examples 1 to 6. In addition, all of the planographic printing plates of Examples 1 to 12 exhibited a remarkably smaller difference between the sensitivities for the two dilution levels of the developer. Since all of these planographic printing plate precursors fulfilled the practicability requirement, i.e., having a difference in sensitivities for the two dilution levels of not greater than 20 mJ/cm$^2$, these planographic printing plate precursors were found to have good latitude in development.

Further, based on the results of the storage stability test, it was confirmed the planographic printing plates of the present invention fulfilled the practicability requirement for storage stability, i.e., a difference in sensitivity of not greater than 20 mJ/cm$^2$ between before and after storage. Accordingly, the planographic printing plates of the present invention was evaluated as having good storage stability.

Example 13

A planographic printing plate precursor was prepared by repeating the procedure of Example 9, except that the added amount of the infrared-ray absorbing agent IR-5 of the Example 9 was changed to 0.011 g.

Example 14

A planographic printing plate precursor was prepared by repeating the procedure of Example 10, except that the added amount of the infrared-ray absorbing agent IR-18 of the Example 10 was changed to 0.011 g.

Comparative Example 7

A planographic printing plate precursor was prepared by repeating the procedure of Comparative Example 5, except that the added amount of the infrared-ray absorbing agent B-1 of the Comparative Example 5 was changed to 0.011 g.

Comparative Example 8

A planographic printing plate precursor was prepared by repeating the procedure of Comparative Example 6, except that the added amount of the infrared-ray absorbing agent B-1 of the Comparative Example 6 was changed to 0.011 g.

The planographic printing plate precursors obtained in the above Examples 13 and 14, and in the Comparative Examples 7 and 8 were evaluated in the same manner as in the Example 1. Results are shown in Table 2.

TABLE 2

| | Infrared-ray absorbing agent | Molecular weight of Infrared-ray absorbing agent | Sensitivity (mJ/cm$^2$) | Latitude in development (mJ/cm$^2$) | Storage stability |
|---|---|---|---|---|---|
| Ex.* 13 | IR-5 | 474 | 115 | 5 | Good |
| Ex.* 14 | IR-18 | 503 | 110 | 10 | Good |
| Comp.** 7 | B-1 | 755 | 150 | 30 | Good |
| Comp.** 8 | B-2 | 631 | 145 | 25 | Good |

Ex.*: Example
Comp.**: Comparative Example

What is claimed is:
1. A photosensitive composition comprising components (a) and (b) as follows, and becoming soluble in an aqueous alkaline solution when irradiated with an infrared laser:
  (a) an infrared-ray absorbing agent represented by formula (I) as follows; and
  (b) a polymeric compound insoluble in water but soluble in an aqueous alkaline solution

(I)

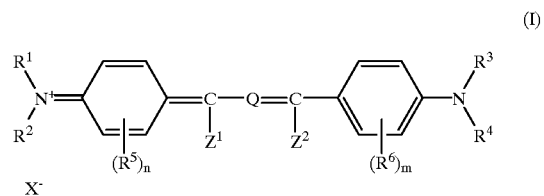

wherein R$^1$ through R$^4$ each independently represents a hydrogen atom, alkyl group or aryl group; R$^5$ and R$^6$ each independently represents an alkyl group, substituted oxy group or halogen atom; n and m each independently represents an integer from 0 through 4; R$^1$ and R$^2$, or R$^3$ and R$^4$ may combine with each other to form a ring, and $R^1$ and/or $R^2$ may combine with $R^5$, or $R^3$ and/or $R^4$ may combine with $R^6$, to form a ring; a plurality of $R^5$ or a plurality of $R^6$ may combine together to form a ring; $Z^1$ and $Z^2$ each independently represents a hydrogen atom, alkyl group or aryl group, at least one of $Z^1$ and $Z^2$ representing a hydrogen atom or an alkyl group; Q represents a trimethyne group or pentamethyne group, each of which may have a substituent group, and is able to form a cyclic structure together with a divalent organic group; and $X^-$ represents a counter anion.

2. The composition according to claim 1, wherein said polymeric compound has a phenolic hydroxyl group, and said polymeric compound is selected from the group consisting of pyrogallol-acetone resins, and phenol-formaldehyde resins, m-cresol-formaldehyde resins, p-cresol-formaldehyde resins, m-/p-mixed-cresol-formaldehyde resins and phenol/cresol mixed formaldehyde resins, in which the cresol is selected from m-cresol, p-cresol, and a mixture of m-cresol and p-cresol.

3. The composition according to claim 1, wherein said polymeric compound has a phenolic hydroxyl group in a side chain.

4. The composition according to claim 3, wherein said polymeric compound is obtained by homopolymerization of a polymerizable monomer having the phenolic hydroxyl group wherein the monomer is selected from the group consisting of phenol group-containing acrylamide, phenol group-containing methacrylamide, phenol group-containing acrylate, phenol group-containing methacrylate, and phenol group-containing hydroxystyrene.

5. The composition according to claim 3, wherein said polymeric compound is obtained by homopolymerization of a polymerizable monomer having the phenolic hydroxyl group wherein the monomer selected from the group consisting of N-(2-hydroxyphenyl)acrylamide, N-(3-hydroxyphenyl)acrylamide, N-(4-hydroxyphenyl)acrylamide, N-(2-hydroxyphenyl)methacrylamide, N-(3-hydroxyphenyl)methacrylamide, N-(4-hydroxyphenyl)methacrylamide, o-hydroxyphenyl acrylate, m-hydroxyphenyl acrylate, p-hydroxyphenyl acrylate, o-hydroxyphenyl methacrylate, m-hydroxyphenyl methacrylate, p-hydroxyphenyl methacrylate, o-hydroxystyrene, m-hydroxystyrene, p-hydroxystyrene, 2-(2-hydroxyphenyl)ethyl acrylate, 2-(3-hydroxyphenyl)ethyl acrylate, 2-(4-hydroxyphenyl)ethyl acrylate, 2-(2-hydroxyphenyl)ethyl methacrylate, 2-(3-hydroxyphenyl)ethyl methacrylate, and 2-(4-hydroxyphenyl)ethyl methacrylate.

6. The composition according to claim 1, wherein said polymeric compound has a sulfonamide group, and said polymer compound is obtained by homopolymerization of a polymerizable monomer having a sulfonamide group or obtained by copolymerization of the polymerizable monomer with other polymerizable monomer(s).

7. The composition according to claim 6, wherein said polymerizable monomer having a sulfonamide group is composed of a compound with a low molecular weight having at least one sulfonamide group —NH—SO$_2$— wherein a molecule of the monomer has at least one hydrogen atom connected to a nitrogen atom and one or more polymerizable unsaturated bonds.

8. The composition according to claim 7, wherein said polymerizable monomer having a sulfonamide group is composed of a compound with a low molecular weight having an acryloyl, allyl or vinyloxy group, and a substituted sulfonylimino or substituted or mono-substituted aminosulfonyl group.

9. The composition according to claim 6, wherein said polymerizable monomer having a sulfonamide group is selected from compounds represented by the following general formulae (3) to (7):

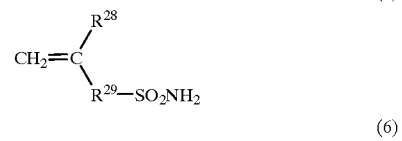

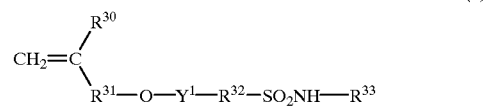

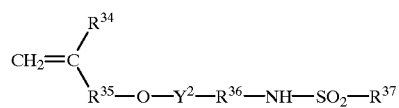

wherein $X^1$ and $X^2$ each independently represents —O— or —NR$^{17}$—; $R^{21}$ and $R^{24}$ each independently represents a hydrogen atom or CH$_3$; $R^{22}$, $R^{25}$, $R^{29}$, $R^{32}$ and $R^{36}$ each independently represents an alkylene group, a cycloalkylene group, an arylene group or an aralkylene group, wherein each group has 1 to 12 carbon atoms and may have a substituent; $R^{23}$, $R^{17}$ and $R^{33}$ each independently represents a hydrogen atom, an alkyl group, a cycloalkylene group, an aryl group or an aralkyl group, wherein each group has 1 to 12 carbon atoms and may have a substituent; $R^{26}$ and $R^{37}$ each independently represents an alkyl group, a cycloalkylene group, an aryl group or an aralkyl group, wherein each group has 1 to 12 carbon atoms and may have a substituent; $R^{28}$, $R^{30}$ and $R^{34}$ each independently represents a hydrogen atom or CH$_3$; $R^{31}$ and $R^{35}$ each independently represents a single bond, or an alkylene group, a cycloalkylene group, an arylene group or an aralkylene group, wherein each group has 1 to 12 carbon atoms and may have a substituent; and $Y^1$ and $Y^2$ each independently represents a single bond or —CO—.

10. The composition according to claim 9, wherein said polymerizable monomer having a sulfonamide group is selected from the group consisting of m-aminosulfonylphenyl methacrylate, N-(p-aminosulfonylphenyl)methacrylamide, and N-(p-aminosulfonylphenyl)acrylamide.

11. The composition according to claim 6, wherein said polymeric compound has an active imide group, and said polymeric compound is obtained by homopolymerization of a polymerizable monomer composed of a compound with a low molecular weight having therein at least one active imino group represented by the following formula and at least one polymerizable unsaturated bond, or obtained by copolymerization of the polymerizable monomer with other polymerizable monomer(s).

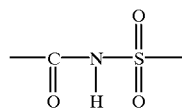

12. The composition according to claim 11, wherein said polymeric compound is N-(p-toluenesulfonyl)methacrylamide or N-(p-toluenesulfonyl)acrylamide.

13. A planographic printing plate precursor comprising a substrate and a photosensitive layer formed thereon, the photosensitive layer comprising the photosensitive composition of claim 1.

* * * * *